(12) United States Patent
Uemura

(10) Patent No.: US 8,976,748 B2
(45) Date of Patent: Mar. 10, 2015

(54) MOBILE STATION APPARATUS, BASE STATION APPARATUS, COMMUNICATION SYSTEM, COMMUNICATION METHOD, INTEGRATED CIRCUIT, AND MOBILE STATION APPARATUS CONTROL PROGRAM

(75) Inventor: Katsunari Uemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 213 days.

(21) Appl. No.: 13/636,591

(22) PCT Filed: Feb. 21, 2011

(86) PCT No.: PCT/JP2011/053634
§ 371 (c)(1),
(2), (4) Date: Oct. 25, 2012

(87) PCT Pub. No.: WO2011/118306
PCT Pub. Date: Sep. 29, 2011

(65) Prior Publication Data
US 2013/0034069 A1    Feb. 7, 2013

(30) Foreign Application Priority Data

Mar. 24, 2010  (JP) ................................. 2010-068713

(51) Int. Cl.
*H04W 4/00* (2009.01)
*H04W 74/08* (2009.01)
(Continued)

(52) U.S. Cl.
CPC .......... *H04W 74/0833* (2013.01); *H04W 72/12* (2013.01)
USPC .......................................... 370/329; 370/338

(58) Field of Classification Search
None
See application file for complete search history.

(56) References Cited

U.S. PATENT DOCUMENTS

| 2007/0161377 A1* | 7/2007 | Kodikara et al. ............. 455/450 |
| 2009/0163211 A1* | 6/2009 | Kitazoe et al. ................ 455/436 |
| 2011/0007698 A1* | 1/2011 | Sagfors et al. ................ 370/329 |

(Continued)

FOREIGN PATENT DOCUMENTS

WO    WO 2009/154102 A1    12/2009

OTHER PUBLICATIONS

Alcatel-Lucent Shanghai Bell, Alcatel-Lucent, "PRACH transmissions in Carrier Aggregation", TSG-RAN WG2#69, R2-101388, pp. 1-3, Feb. 22-26, 2010.

(Continued)

*Primary Examiner* — Eunsook Choi
(74) *Attorney, Agent, or Firm* — Birch, Stewart, Kolasch & Birch, LLP

(57) ABSTRACT

When a mobile station apparatus capable of being connected to a base station apparatus by using a plurality of frequency bands performs an uplink transmission, the mobile station apparatus selects the optimum combination among the combinations of a plurality of frequency bands and uplink transmission methods, and performs the uplink transmission. The mobile station apparatus aggregates a plurality of cells to connect the same to a base station apparatus and requests, from the base station apparatus, an uplink radio resource required to transmit uplink data. The mobile station apparatus selects, based on a first condition, an uplink for making a radio resource request using a random access channel from the plurality of cells, and selects, based on a second condition, either the radio resource request using the random access channel or the transmission of uplink data using an uplink radio resource common to other mobile station apparatuses.

4 Claims, 11 Drawing Sheets

(51) Int. Cl.
*H04W 72/12* (2009.01)
*H04H 20/67* (2008.01)

(56) References Cited

U.S. PATENT DOCUMENTS

2011/0128928 A1* 6/2011 Lin et al. .................. 370/329
2011/0194432 A1 8/2011 Kato et al.

OTHER PUBLICATIONS

Catt, "Consideration on RACH in CA", 3GPP TSG RAN WG2 Meeting #69, R2-101058, pp. 1-4, Feb. 22-26, 2010.
Catt, "Impact of carrier aggregation on MAC layer", 3GPP TSG-RAN WG2 #67bis, R2-095484, pp. 1-5, Oct. 12-16, 2009.
E-mail rapporteur (NTT Docomo, Inc.), "CA support for multi-TA", 3GPP TSG-RAN2#69, R2-101567, pp. 1-12, Feb. 22-26, 2010.
Ericsson, ST-Ericsson, "Contention based uplink transmissions", 3GPP TSG-RAN WG2 #66bis, R2-093812, pp. 1-4, Jun. 29-Jul. 3, 2009.
Fujitsu, "RACH for connected mode in carrier aggregation", 3GPP TSG-RAN WG2 Meeting #69, R2-101541, pp. 1-2, Feb. 22-26, 2010.
Interdigital, "RACH Procedures for Carrier Aggregation", 3GPP TSG-RAN WG2 Meeting #69, R2-101304, Feb. 22-26, 2010.
International Search Report for PCT/JP2011/053634 dated Mar. 15, 2011.
Samsung, "UL CC selection for RACH", 3GPP TSG RAN WG2#69, R2-101039, Feb. 22-26, 2010.

* cited by examiner

MOBILE STATION APPARATUS, BASE STATION APPARATUS, COMMUNICATION SYSTEM, COMMUNICATION METHOD, INTEGRATED CIRCUIT, AND MOBILE STATION APPARATUS CONTROL PROGRAM

TECHNICAL FIELD

The present invention relates to mobile station apparatuses, base station apparatuses, communication systems, communication methods, integrated circuits, and mobile station apparatus control programs, and in particular relates to the uplink transmission technique when a mobile station apparatus is simultaneously receiving a plurality of frequency bands.

BACKGROUND ART

In the 3GPP (3rd Generation Partnership Project) that is a standardization project, Evolved Universal Terrestrial Radio Access (hereinafter, referred to as EUTRA), which has realized fast communication by employing a flexible scheduling per predetermined frequency/time referred to as an OFDM (Orthogonal Frequency-Division Multiplexing) communication scheme or a resource block, is now under study. In EUTRA, a mobile station apparatus makes a radio resource request (a scheduling request), thereby requesting radio resource allocation information (uplink grant) indicative of the transmission permission of a physical uplink shared channel, for transmitting uplink data, from a base station apparatus. The radio resource request is made by using a physical uplink control channel or a physical random access channel individually allocated to the mobile station apparatus (the detailed description of each channel will be described later).

In the radio resource request using a physical uplink control channel, a certain time is consumed before data is transmitted. Therefore, Non Patent Literature 1 proposes a contention-based data transmission method, wherein to a mobile station apparatus in which an uplink transmission timing is already adjusted, a base station apparatus newly allocates an uplink radio resource common to mobile station apparatuses using an uplink grant, and a mobile station apparatus having data to be transmitted transmits the data by using the uplink radio resource common to mobile station apparatuses, thereby reducing a delay time required to transmit uplink data. The uplink radio resource in this case is particularly referred to as also a contention-based radio resource.

Moreover, in the 3GPP, the discussion on Advanced EUTRA realizing faster data transmission and having upward compatibility with EUTRA is started. As the technique in Advanced EUTRA, carrier aggregation is proposed. The carrier aggregation is a technique for improving the data rate by aggregating and using a plurality of different frequency bands (referred to as also component carriers). Furthermore, it is also proposed that a mobile station apparatus communicating with a base station apparatus by using the carrier aggregation has a plurality of uplink transmission timings (Timing Advance) for each frequency or for each component carrier (Non-Patent Document 2).

PRIOR ART DOCUMENT

Non-Patent Document

Non-patent document 1: R2-093812, Ericsson, ST-Ericsson, 3GPP TSG-RAN WG2#66bis, 29 Jun.-03 Jul., 2009, Los Angeles, USA Non-patent document 2: R2-101567, NTT DOCOMO, 3GPP TSG-RAN WG2#69, 22-26 Feb. 2010, San Francisco, USA

DISCLOSURE OF THE INVENTION

Summary of the Invention

Problems to be Solved by the Invention

However, a detailed study has not been made, on a case where the uplink contention-based data transmission method as proposed in Non-Patent Literature 1 is applied to a mobile station apparatus that is communicating by using a plurality of frequency bands (multicarrier) as in the carrier aggregation. In particular, when a mobile station apparatus requires the management of a plurality of uplink transmission timings during carrier aggregation, if the radio resource for uplink transmission data has not been allocated, the optimum uplink transmission method needs to be selected in accordance with the receiving state of the mobile station apparatus and the allocation state of a physical channel. However, there is a problem in which how to select the optimum uplink transmission method is not determined yet. In particular, there is a problem in which it is not yet resolved whether, in a plurality of uplink frequency bands, a mobile station apparatus performs, with a higher priority, any one of a radio resource request by using a physical random access channel and a contention-based data transmission and thus the optimum uplink transmission cannot be performed.

The present invention has been made in view of the above circumstances, and an object is to provide a mobile station apparatus, a base station apparatus, a communication system, a communication method, an integrated circuit, and a mobile station apparatus control program which, when a base station apparatus capable of connecting to a mobile station apparatus by using a plurality of frequency bands performs uplink transmission, can select the optimum one from the combinations of a plurality of frequency bands and uplink transmission methods and can perform the uplink transmission.

Means for Solving the Problems (1) In order to achieve the above-described objective, the present invention employs the following configuration. That is, a mobile station apparatus of the present invention is the one aggregating a plurality of cells to connect the same to a base station apparatus and requesting, from the base station apparatus, an uplink radio resource required to transmit uplink data, wherein the mobile station apparatus selects: based on a first condition, an uplink for making a radio resource request using a physical random access channel is selected from the plurality of cells, and based on a second condition, either the radio resource request using the physical random access channel or the transmission of uplink data by using an uplink radio resource common to other mobile station apparatuses.

(2) In addition, in the mobile station apparatus of the present invention, the first condition is that a transmission setting of a random access channel is already made and that the relevant uplink is an uplink corresponding to a downlink of a cell having the best reception quality.

(3) Furthermore, in the mobile station apparatus of the present invention, the first condition is that a transmission setting of a random access channel is already made and that the relevant uplink is an uplink of a cell capable of most quickly transmitting a physical random access channel.

(4) Moreover, in the mobile station apparatus of the present invention, the first condition is that a transmission setting of a random access channel is already made and that the relevant uplink is an uplink corresponding to a downlink of a cell having the best reception quality among uplinks of a cell capable of most quickly transmitting a physical random access channel.

(5) In the mobile station apparatus of the present invention, the first condition includes the fact that a transmission timing of an uplink between the mobile station apparatus and the base station apparatus is already adjusted.

(6) In addition, in the mobile station apparatus of the present invention, the second condition is that when, to the uplink of the cell selected based on the first condition, an uplink radio resource common to other mobile station apparatuses has been allocated prior to a physical random access channel, the transmission of an uplink data with the uplink radio resource is selected, while when the uplink radio resource common to other mobile station apparatuses has not been allocated prior to a physical random access channel, a radio resource request using the physical random access channel is selected.

(7) Moreover, in the mobile station apparatus of the present invention, the second condition is that when, to an uplink corresponding to a downlink of a cell having a reception quality satisfying a predetermined quality, the uplink of a cell being other than an uplink of the cell selected based on the first condition, an uplink radio resource common to other mobile station apparatuses has been allocated prior to a physical random access channel allocated to the uplink of the selected cell, the transmission of uplink data using the uplink radio resource is selected, while when to an uplink corresponding to a downlink of a cell having a reception quality satisfying a predetermined quality, the uplink of a cell being other than an uplink of the cell selected based on the first condition, an uplink radio resource common to other mobile station apparatuses has not been allocated prior to a physical random access channel allocated to the uplink of the selected cell, the radio resource request using the physical random access channel is selected.

(8) Furthermore, the base station apparatus of the present invention individually sets the first condition and the second condition to the mobile station apparatus according to any of (1) to (7) described above.

(9) In addition, a communication system of the present invention is the one, in which a base station apparatus and a mobile station apparatus are connected to each other through aggregation of a plurality of cells and in which the mobile station apparatus requests, from the base station apparatus, an uplink radio resource required to transmit uplink data, wherein the base station apparatus individually sets a first condition and a second condition to the mobile station apparatus, and wherein the mobile station apparatus, based on the first condition, selects an uplink for making a radio resource request using a physical random access channel from the plurality of cells, and the mobile station apparatus, based on the second condition, selects either the radio resource request using the physical random access channel or the transmission of uplink data by using an uplink radio resource common to other mobile station apparatuses.

(10) Furthermore, in the communication system of the present invention, the first condition is that a transmission setting of a random access channel is already made and that the relevant uplink is an uplink corresponding to a downlink of a cell having the best reception quality.

(11) Moreover, in the communication system of the present invention, the first condition is that a transmission setting of a random access channel is already made and that the relevant uplink is an uplink of a cell capable of most quickly transmitting a physical random access channel.

(12) In addition, in the communication system of the present invention, the first condition is that a transmission setting of a random access channel is already made and that the relevant uplink is an uplink corresponding to a downlink of a cell having the best reception quality among uplinks of a cell capable of most quickly transmitting a physical random access channel.

(13) Furthermore, in the communication system of the present invention, the first condition includes the fact that a transmission timing of an uplink between the mobile station apparatus and the base station apparatus is already adjusted.

(14) Moreover, in the communication system of the present invention, the second condition is that when, to the uplink of the cell selected based on the first condition, an uplink radio resource common to other mobile station apparatuses has been allocated prior to a physical random access channel, the transmission of uplink data using the uplink radio resource is selected, while when an uplink radio resource common to other mobile station apparatuses has not been allocated prior to a physical random access channel, a radio resource request using the physical random access channel is selected.

(15) In addition, in the communication system of the present invention, the second condition is that when to an uplink corresponding to a downlink of a cell having a reception quality satisfying a predetermined quality, the uplink of a cell being other than an uplink of the cell selected based on the first condition, an uplink radio resource common to other mobile station apparatuses has been allocated prior to a physical random access channel allocated to the uplink of the selected cell, the transmission of uplink data using the uplink radio resource is selected, while when to an uplink corresponding to a downlink of a cell having a reception quality satisfying a predetermined quality, the uplink of a cell being other than an uplink of the cell selected based on the first condition, an uplink radio resource common to other mobile station apparatuses has not been allocated prior to a physical random access channel allocated to the uplink of the selected cell, the radio resource request using the physical random access channel is selected.

(16) Furthermore, a communication method of the present invention is the one, in which a base station apparatus and a mobile station apparatus are connected to each other through aggregation of a plurality of cells and in which the mobile station apparatus requests, from the base station apparatus, an uplink radio resource required to transmit uplink data, the communication method comprising at least the steps of: in the base station apparatus, individually setting a first condition and a second condition to the mobile station apparatus, and in the mobile station apparatus, selecting, based on the first condition, an uplink for making a radio resource request using a physical random access channel from the plurality of cells; and selecting, based on the second condition, either the radio resource request using the physical random access channel or the transmission of uplink data using an uplink radio resource common to other mobile station apparatuses.

(17) In addition, an integrated circuit of the present invention is the one causing a mobile station apparatus to exert a plurality of functions by being implemented in the mobile station apparatus, the integrated circuit including a series of functions of: aggregating a plurality of cells to connect the same to a base station apparatus; requesting, from the base station apparatus, an uplink radio resource required to transmit uplink data; selecting, based on the first condition, an uplink for making a radio resource request using a physical random access channel from the plurality of cells; and selecting, based on the second condition, either the radio resource request using the physical random access channel or the transmission of uplink data by using an uplink radio resource common to other mobile station apparatuses.

(18) Furthermore, a mobile station apparatus control program of the present invention is the one for aggregating a plurality of cells to connect the same to a base station apparatus and requesting, from the base station apparatus, an uplink radio resource required to transmit uplink data, wherein the control program converts a series of processing into commands so as to enable a computer to read and execute them, the series of processing including processing of: requesting, from the base station apparatus, an uplink radio resource required to transmit uplink data; selecting, based on the first condition, an uplink for making a radio resource request using a physical random access channel from the plurality of cells; and selecting, based on a second condition, either the radio resource request using the physical random access channel or the transmission of uplink data by using an uplink radio resource common to other mobile station apparatuses.

Effect of the Invention

According to the present invention, when a base station apparatus capable of connecting to a mobile station apparatus by using a plurality of frequency bands performs uplink transmission, the optimum one can be selected from the combinations of a plurality of frequency bands and uplink transmission methods to thereby perform the uplink transmission.

BEST MODES FOR CARRYING OUT THE INVENTION

Figure 1:
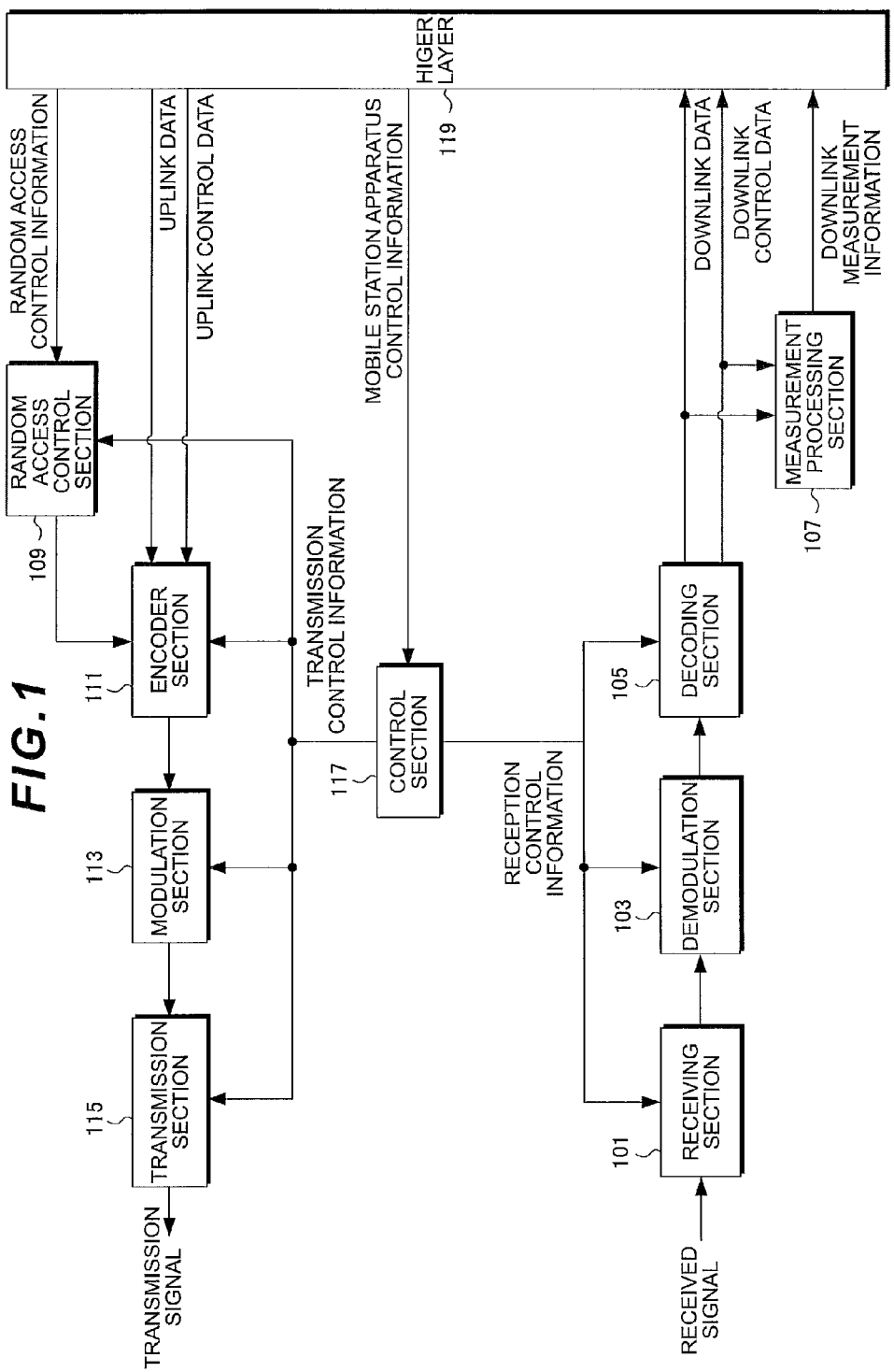
FIG. 1 is a block diagram showing a schematic configuration of a mobile station apparatus according to the present invention.

A communication system according to an embodiment is the communication system, wherein a base station apparatus and a mobile station apparatus are connected to each other by aggregating a plurality of frequency bands and wherein the mobile station apparatus uses a physical random access channel in order to request the base station apparatus for an uplink radio resource, wherein the base station apparatus allocates to the mobile station apparatus a plurality of transmission settings of a random access channel applied to at least one uplink frequency band, and wherein the mobile station apparatus, when requesting, from the base station apparatus, an uplink radio resource required to transmit uplink data, selects, based on a first condition, an uplink frequency band for making a radio resource request using a physical random access channel, and selects, based on a second condition, an uplink transmission method of either a radio resource request using a physical random access channel or the uplink transmission by using an uplink radio resource common to the mobile station apparatuses.

In this specification, the present invention is disclosed in relation to an improvement of a mobile station apparatus, a base station apparatus, a communication system, and a radio resource allocation method, when the mobile station apparatus and the base station apparatus are connected to each other by using a plurality of frequency bands. However, the communication scheme to which the present invention is applicable is not limited to the communication scheme upward-compatible with EUTRA, such as EUTRA or Advanced EUTRA.

First, the carrier aggregation, the physical channel, and the uplink transmission method according to the embodiment will be briefly described.

(1) Carrier Aggregation

The carrier aggregation is a technique for aggregating a plurality of different uplink or downlink frequency bands (component carriers) and treating the same as one frequency band. For example, if five component carriers each having a frequency bandwidth of 20 MHz are aggregated by the carrier aggregation, a mobile station apparatus can regard the five component carriers as a frequency bandwidth of 100 MHz and can similarly access. It should be noted that the component carriers to be aggregated may be contiguous frequency bands or may be frequency bands all of or a part of which are non-contiguous. For example, when the available frequency bands are a 800 MHz band, a 2.4 GHz band, and a 3.4 GHz band, one certain component carrier may be transmitted in the 800 MHz band, another component carrier in the 2 GHz band, and yet another component carrier in the 3.4 GHz band.

Moreover, contiguous or non-contiguous component carriers within the same frequency band, e.g., a 2.4 GHz band, can be also aggregated. The frequency bandwidth of each component carrier may be a frequency bandwidth narrower than 20 MHz, or the respective frequency bandwidths may differ. A base station apparatus can increase or decrease the number of uplink or downlink component carriers allocated to a mobile station apparatus, based on various factors such as the stagnant amount of a data buffer, the reception quality of the mobile station apparatus, a load within a cell, QoS or the like.

(2) Physical Channel

The main physical channels (or physical signals) used in EUTRA and Advanced EUTRA will be described. A physical channel might be added in future or the structure of the physical channel might be modified in EUTRA and Advanced EUTRA. Even if modified, the description of each embodiment of the present invention is not affected. A synchronization signal includes three types of primary synchronization signals and a secondary synchronization signal made up of 31 types of symbols that are alternately arranged in a frequency domain, wherein a combination of the primary synchronization signals and the secondary synchronization signal expresses 504 kinds of physical cell identifiers (cell ID: Physical Cell Identity; PCI) for identifying a base station apparatus, and a frame timing for radio synchronization. A mobile station apparatus identifies the cell ID of a synchronization signal received by cell search.

A physical broadcast channel (PBCH) is transmitted for the purpose of notification of a control parameter (broadcast information (system information)) used in common in the mobile station apparatuses within a cell. For the broadcast information the notification of which is not provided through the use of a physical broadcast channel, the notification of a radio resource is provided through the use of a physical downlink control channel, and this information is transmitted as a layer 3 message (system information) through the use of a physical downlink shared channel. As the broadcast information, notification of a cell global identifier (CGI) indicative of a cell-specific identifier, a tracking area identifier (TAI) for managing a standby area due to paging, or the like are provided.

A downlink reference signal is a pilot signal transmitted with a predetermined electric power for each cell. Moreover, the downlink reference signal is a known signal that is periodically repeated at a frequency/time position based on a predetermined rule. A mobile station apparatus measures the reception quality for each cell by receiving the downlink reference signal. Moreover, a mobile station apparatus uses the downlink reference signal also as a reference signal for the purpose of demodulation of a physical downlink control channel transmitted simultaneously with a downlink reference signal or demodulation of a physical downlink shared channel. As a sequence used for the downlink reference signal, the sequence identifiable for each cell is used. It should be noted that, while a downlink reference signal may be referred to as a cell-specific RS (cell-specific reference signal), the use and meaning thereof are the same.

The physical downlink control channel (PDCCH) is transmitted by using several OFDM symbols from the beginning of each subframe, and is used for the purpose of indicating, to a mobile station apparatus, the radio resource allocation information following the scheduling of a base station apparatus or the adjustment amount of increase/decrease in the transmission power. A mobile station apparatus needs to acquire, from a physical downlink control channel, radio resource allocation information referred to as an uplink grant at the time of transmission and a downlink grant at the time of reception, by monitoring the physical downlink control channel addressed to its own station before transmitting/receiving the layer 3 message (such as a paging or handover command), which is downlink data or downlink control data, and by receiving a physical downlink control channel addressed to its own station.

The physical uplink control channel (PUCCH) is used in order to make a reception acknowledgment response of data that was transmitted by using a physical downlink shared channel, a downlink channel quality indicator (CQI), and a scheduling request (SR) that is a request for an uplink radio resource. The physical downlink shared channel (PDSCH) is used also to provide notification of paging or broadcast information as the layer 3 message that is downlink control data, in addition to downlink data. The radio resource allocation information of the physical downlink shared channel is indicated in the physical downlink control channel. The physical uplink shared channel (PUSCH) transmits mainly uplink data and uplink control data, and can also include control data, such as the reception quality of an uplink and ACK/NACK. Moreover, as with the downlink, the radio resource allocation information of a physical uplink shared channel is indicated in the physical downlink control channel.

The physical random access channel (PRACH) is the channel used to provide the notification of a preamble sequence, and has a guard time. The physical random access channel is used as access means of a mobile station apparatus to a base station apparatus. A mobile station apparatus uses a physical random access channel in order to make a request of a radio resource when a physical uplink control channel is not configured yet, or in order to request, from a base station apparatus, transmission timing adjustment information (referred to as also a timing advance (TA)) required to align the uplink transmission timing with a reception timing window of the base station apparatus. A mobile station apparatus having received the transmission timing adjustment information sets a validity period of the transmission timing adjustment information (sets a TA timer), and manages, during the validity period, the state as a transmission timing adjustable state and manages, beyond the validity period, the state as a transmission timing non-adjustable state. A base station apparatus can also allocate a dedicated preamble sequence to a mobile station apparatus to start random access. It should be noted that, since physical channels other than the one described-above do not relate to each embodiment of the present invention, the detailed description thereof is omitted.

(3) Uplink Transmission Method

In EUTRA, as the methods for a mobile station apparatus to start transmitting uplink data to a base station apparatus, there are prepared the following three methods. A first method is a method, in which when a mobile station apparatus allocates, to a base station apparatus, a resource (transmission setting (configuration)) of a physical uplink control channel required to make a radio resource request, the mobile station apparatus makes a radio resource request to the base station apparatus (request for transmission of an uplink grant) through the use of a physical uplink control channel. When the mobile station apparatus cannot receive the uplink grant from the base station apparatus even if reaching the maximum number of times of transmission of a physical uplink control channel, the mobile station apparatus releases the resource of the physical uplink control channel. In the first method, the mobile station apparatus is in a transmission timing adjustable state.

A second method is a method, in which when a mobile station apparatus is in a transmission timing adjustable state but a base station apparatus does not allocate, to the mobile station apparatus, the physical uplink control channel required to make a radio resource request or when the TA timer is in a non-operation state (in a transmission timing non-adjustable state), the mobile station apparatus makes a radio resource request to the base station apparatus by using a physical random access channel. A third method is a method, in which when a mobile station apparatus is in a transmission timing adjustable state, if a base station apparatus has allocated a contention-based radio resource by using a physical downlink control channel, the mobile station apparatus having the data to be transmitted transmits the uplink data by using a contention-based radio resource common to mobile station apparatuses. The third method differs from the other methods in that a base station apparatus, regardless of a request from a mobile station apparatus, indicates a radio resource for transmitting a physical uplink shared channel.

[Example of a Communication Network Configuration of the Present Invention]

Figure 10:
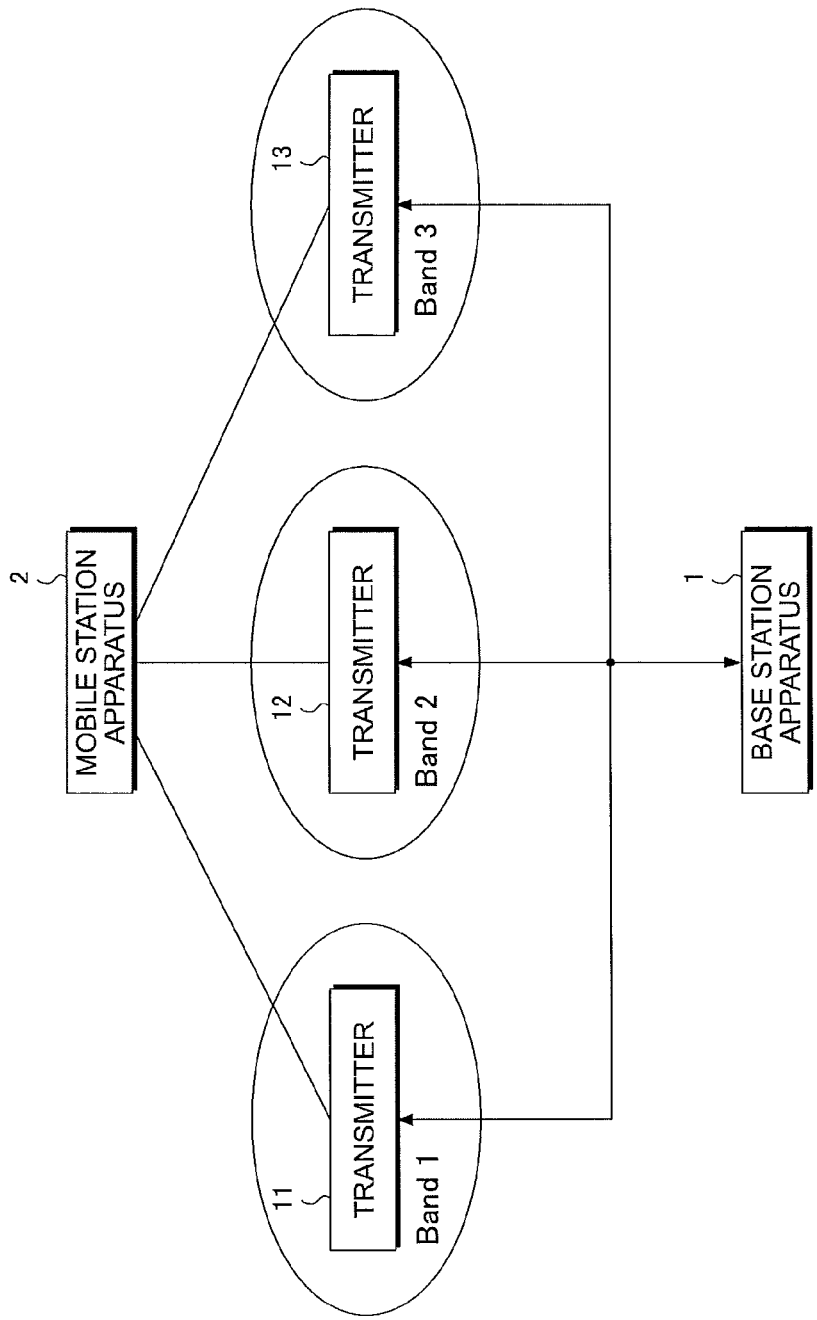
FIG. 10 is a view showing an example of a communication network configuration according to an embodiment of the present invention.

FIG. 10 is a view showing an example of the communication network configuration according to an embodiment of the present invention. When a mobile station apparatus 1 can be radio-connected to the base station apparatus 2 simultaneously using a plurality of frequency bands (component carriers; Band 1 to Band 3) through carrier aggregation, it is preferable from a viewpoint of simplification of the control that as a communication network configuration, one certain base station apparatus 2 includes transmitters 11-13 (and non-illustrated receivers 21-23) for every plurality of frequency bands and the control of each frequency band is made by one base station apparatus 2. However, for the reason that a plurality of frequency bands constitutes a contiguous frequency band, the base station apparatus 2 may transmit a plurality of frequency bands with one transmitter. Furthermore, the timing of transmission/reception may differ for each frequency band. The communicable range of each frequency band controlled by the transmitters 11-13 of the base station apparatus 2 is regarded as a cell. At this time, the area (cell) each frequency band covers may have a different size and a different shape from each other.

However, in the following description, an area covered by the frequency of a component carrier the base station apparatus 2 forms is referred to as a cell, respectively, for explanation. It should be noted that this may differ from the definition of a cell in the actually operated communication system. For example, in a certain communication system, some of component carriers used by carrier aggregation may be defined simply as an additional radio resource instead of as a cell. By referring a component carrier as a cell in the present invention, even if a case may occur where the definition of a component carrier differs from that of a cell in the actually operated communication system, the gist of the present invention is not affected. It should be noted that the mobile station apparatus 1 may be radio-connected to the base station apparatus 2 via a relay station apparatus (or a repeater) for each frequency band. That is, the base station apparatus 2 of the present invention can be replaced with a relay station apparatus.

It should be noted that the third generation base station apparatus 2 which the 3GPP specifies is referred to as a NodeB while the base station apparatus 2 in EUTRA and Advanced EUTRA is referred to as an eNodeB. The base station apparatus 2 manages a cell that is an area with which the mobile station apparatus 1 can communicate, and the cell is referred to as also a femtocell, a picocell, or a nanocell depending on the size of the area in which the base station apparatus 2 can communicate with the mobile station apparatus 1. Furthermore, when the mobile station apparatus 1 can communicate with a certain base station apparatus 2, the cell of the base station apparatus 2 is referred to as a serving cell of the mobile station apparatus 1 and the other cells are referred to as neighboring cells.

[Example of the Configuration Setting of a Component Carrier]

Figure 11:
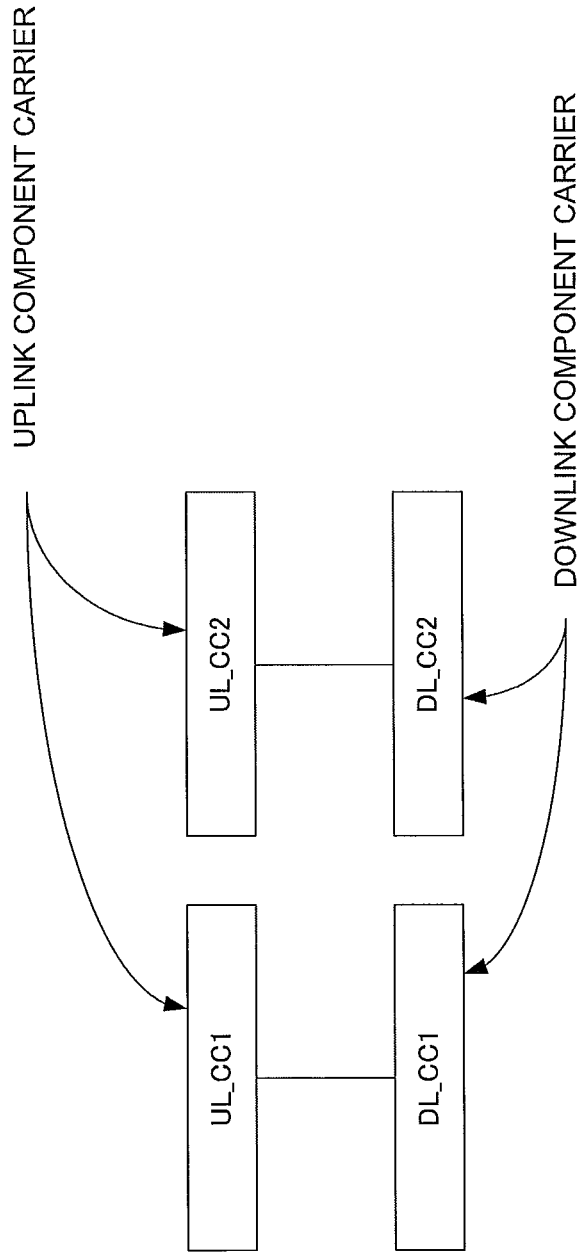
FIG. 11 is a view showing an example of a correspondence relation between a downlink component carrier and an uplink component carrier, which a base station apparatus 2 sets to the mobile station apparatus 1, when the mobile station apparatus 1 according to the embodiment of the present invention performs carrier aggregation.

FIG. 11 is a view showing an example of the correspondence relationship between a downlink component carrier and an uplink component carrier, which the base station apparatus 2 sets to the mobile station apparatus 1, when the mobile station apparatus 1 according to an embodiment of the present invention performs carrier aggregation. There is a cell-specific linkage between a downlink component carrier DL_CC1 and an uplink component carrier UL_CC1, and between a downlink component carrier DL_CC2 and an uplink component carrier UL_CC2, respectively, in FIG. 11.

The cell-specific linkage is, for example, a correspondence relationship (cooperation relationship) between the frequency bands of the uplink and downlink accessible to the base station apparatus 2, when the mobile station apparatus 1 does not aggregate carriers, and typically this correspondence relationship is indicated for each component carrier, by broadcast information. The correspondence between the frequency bands of the uplink and downlink is explicitly indicated as frequency information in the broadcast information, or when not explicitly indicated, it is implicitly indicated, for example, by using the information of a specified frequency difference between an uplink and a downlink that is uniquely determined for each operating frequency. Not limited to these methods, if the correspondence between the frequency bands of the uplink and downlink can be indicated for each cell, it may be indicated using a method other than the above described ones. A plurality of component carriers may be in cell-specific linkage with one component carrier.

In contrast, the base station apparatus 2 can also individually set the correspondence between a downlink component carrier and an uplink component carrier for each mobile station apparatus 1 (referred to as "UE specific linkage"), aside from the cell-specific linkage. A plurality of component carriers may be in UE specific linkage with one component carrier. The mobile station apparatus 1, even when a plurality of UL_CC's have been set to the base station apparatus 2, allocates a physical uplink control channel for making a scheduling request only to either one of UL_CC's. In contrast, the base station apparatus 2 can also allocate a plurality of physical random access channels for each UL_CC or for each frequency band. While taking into consideration the aforementioned points, hereinafter, based on the accompanying drawings, the preferable embodiments of the present invention will be described in detail. It should be noted that, in the description of the present invention, when it is judged that a specific description of a well-known function or configuration related to the present invention obscures the scope of the present invention, the detailed description thereof is omitted.

<First Embodiment>

A first embodiment of the present invention will be described below. The embodiment relates to an uplink transmission method at the time of carrier aggregation of the mobile station apparatus 1, and specifically shows a method for selecting a component carrier when the mobile station apparatus 1 newly initiates uplink transmission and a method for selecting an uplink transmission method.

FIG. 1 is a block diagram showing a schematic configuration of the mobile station apparatus 1 according to the present invention. The mobile station apparatus 1 comprises a receiving section 101, a demodulation section 103, a decoding section 105, a measurement processing section 107, a random access control section 109, an encoder section 111, a modulation section 113, a transmission section 115, a control section 117, and a higher layer 119. The higher layer 119 includes an RRC (Radio Resource Control) performing radio resource control. Moreover, the random access control section 109 serves as a part of a MAC (Medium Access Control) managing a data link layer. Prior to reception, mobile station apparatus control information is input to the control section 117 from the higher layer 119, and the control information related to the reception is appropriately input to the receiving section 101, the demodulation section 103, and the decoding section 105 as the reception control information. The mobile station apparatus control information is set by the base station apparatus 2 or a system parameter, and the higher layer 119 inputs this information as required. Moreover, the reception control information includes information, such as a reception timing of each channel, a multiplexing method, and radio resource arrangement information, other than the information of a received frequency bandwidth.

A received signal is received in the receiving section 101. The receiving section 101 receives a signal, in a frequency band specified by the reception control information. The received signal is input to the demodulation section 103. The demodulation section 103 demodulates the received signal and inputs the resulting signal to the decoding section 105, which properly decodes downlink data and downlink control data and inputs each decoded data to the higher layer 119. The measurement processing section 107 measures the reception quality (SIR, SINR, RSRP, RSRQ, RSSI, a path-loss, etc.) of the downlink reference signal for each cell (component carrier), or generates downlink measurement information based on the measurement result of the reception error rate of a physical downlink control channel or a physical downlink shared channel and outputs the downlink measurement information to the higher layer 119.

Moreover, prior to transmission, the mobile station apparatus control information is input to the control section 117 from the higher layer 119, and the control information related to the transmission is appropriately input to the random access control section 109, the encoder section 111, the modulation section 113, and the transmission section 115 as transmission control information. The transmission control information includes information, such as coding information, modulation information, the information of transmission frequency bandwidths, the transmission timing related to each channel, a multiplexing method, and radio resource arrangement information as the uplink scheduling data of a transmission signal. The random access control information is input to the random access control section 109 from the higher layer 119. The random access control information includes preamble information, the radio resource information for physical random access channel transmission, and the like.

The encoder section 111 receives uplink data and uplink control data from the higher layer 119, and also receives the random access data information related to the transmission of a physical random access channel from the random access control section 109. The encoder section 111, following the transmission control information, appropriately encodes each data and outputs the result to the modulation section 113. The modulation section 113 modulates the output from the encoder section 111. The transmission section 115 maps the output of the modulation section 113 to a frequency domain and also converts a signal in the frequency domain to a signal in a time domain, and multiplexes this signal onto a carrier of a predetermined frequency, and amplifies the resulting signal in power and transmits the amplified signal. The physical uplink shared channel, in which uplink control data is arranged, typically constitutes the layer 3 message (radio resource control message; RRC message). In FIG. 1, the other constituent elements of the mobile station apparatus 1 do not relate to the embodiment and thus are omitted.

Figure 2:
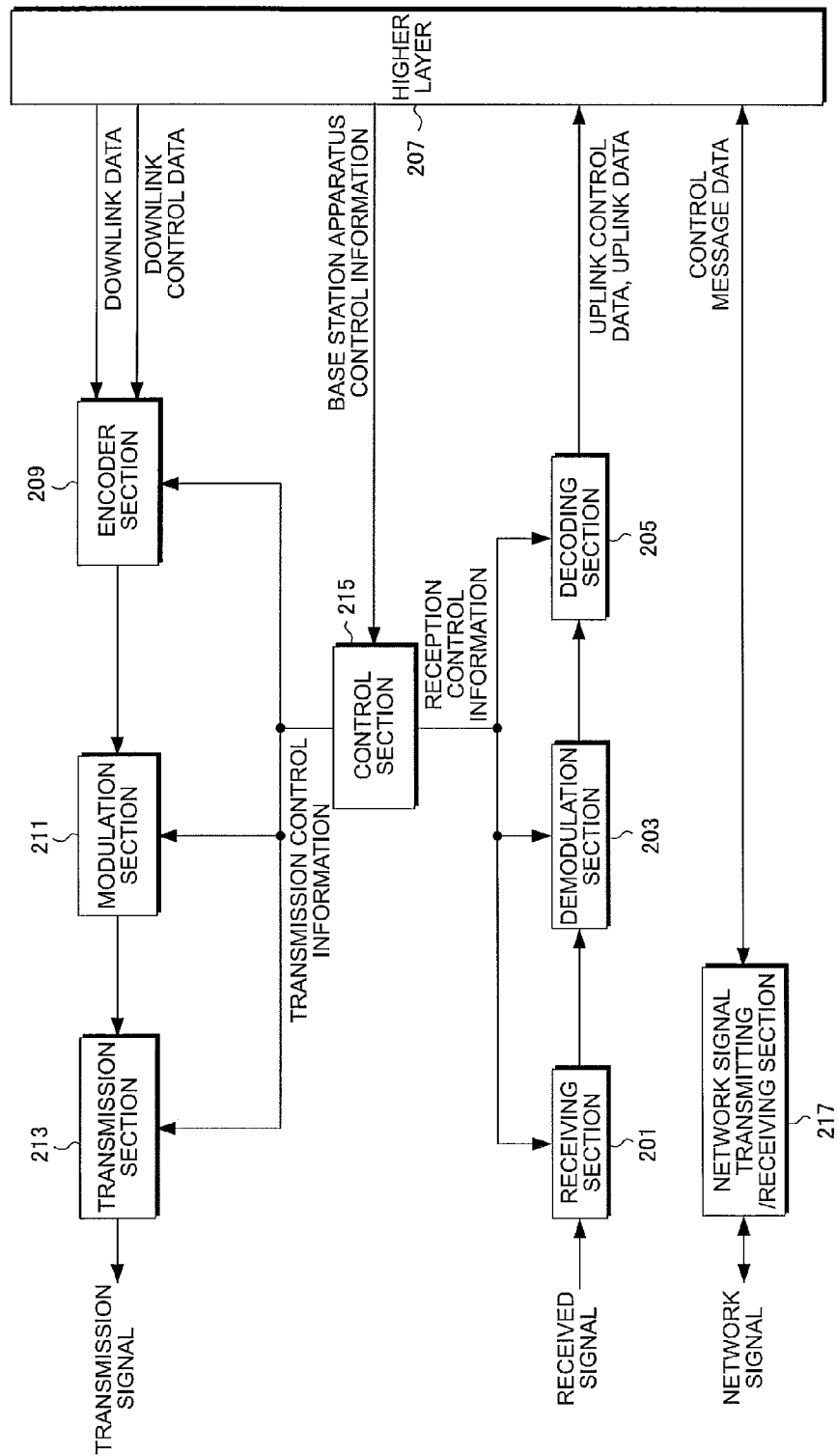
FIG. 2 is a block diagram showing a schematic configuration of a base station apparatus according to the present invention.

FIG. 2 is a block diagram showing a schematic configuration of the base station apparatus 2 according to the present invention. The base station apparatus 2 comprises a receiving section 201, a demodulation section 203, a decoding section 205, a higher layer 207, an encoder section 209, a modulation section 211, a transmission section 213, a control section 215, and a network signal transmitting/receiving section 217. The higher layer 207 inputs downlink data and downlink control data to the encoder section 209. The encoder section 209 encodes the input data and inputs the result to the modulation section 211. The modulation section 211 modulates the encoded signal. Moreover, a signal output from the modulation section 211 is input to the transmission section 213. The transmission section 213, after mapping the input signal to the frequency domain, converts a signal in the frequency domain to a signal in the time domain, and multiplexes this signal onto the carrier of a predetermined frequency, and amplifies the resulting signal in power and transmits the amplified signal. The physical downlink shared channel, in which downlink control data is arranged, typically constitutes the layer 3 message (RRC message).

Moreover, the receiving section 201 converts a signal received from the mobile station apparatus 1 (the signal may be received via a relay station apparatus) to a digital signal of a baseband. The digital signal is input to the demodulation section 203 and demodulated. The signal demodulated by the demodulation section 203 is then input to the decoding section 205, which decodes this signal and output the properly decoded uplink control data or uplink data to the higher layer 207. Base station apparatus control information required for control of each of these blocks is set by a higher-level network device (MME or gateway device) or a system parameter, and the higher layer 207 inputs this information to the control section 215 as required. The control section 215 appropriately inputs the base station apparatus control information related to transmission to each of the blocks of the encoder section 209, the modulation section 211, and the transmission section 213, as transmission control information and appropriately inputs the base station apparatus control information related to reception to each of the blocks of the receiving section 201, the demodulation section 203, and the decoding section 205 as reception control information. The RRC of the base station apparatus 2 is present as a part of the higher layer 207.

In contrast, the network signal transmitting/receiving section 217 transmits/receives a control message of between the base station apparatuses 2 or between a network device and the base station apparatus 2. In FIG. 2, the other constituent elements of the base station apparatus 2 do not relate to the present invention and thus are omitted. Moreover, for the network configuration of a communication system, in which the mobile station apparatus 1 and the base station apparatus 2 are arranged, the configuration similar to that shown in FIG. 10 can be applied.

Figure 3:
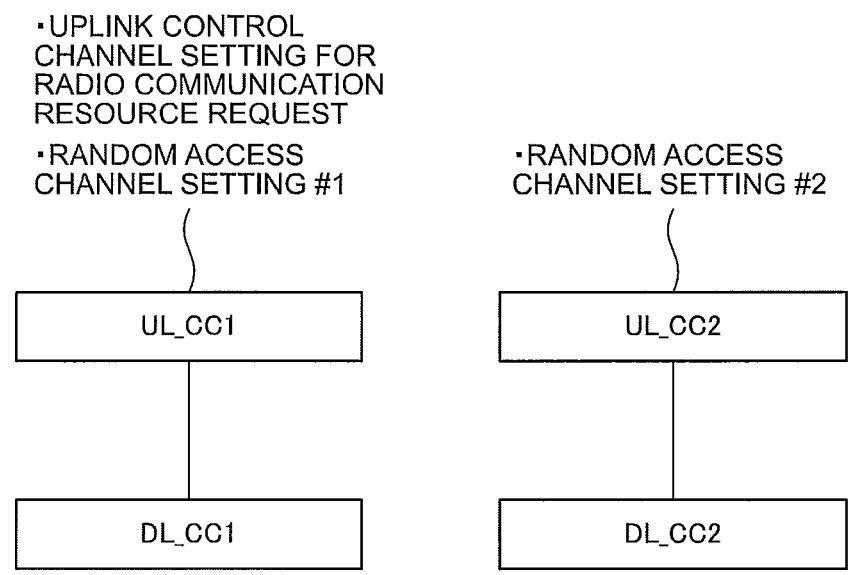
FIG. 3 is a view showing an example of the configuration of a component carrier set in a mobile station apparatus 1 capable of carrier aggregation, and the setting of an uplink physical channel, in the present invention.

FIG. 3 is a view showing an example of the configuration of a component carrier set in the mobile station apparatus 1 capable of carrier aggregation and an uplink physical channel setting, in the present invention. In the example of FIG. 3, as the configuration of component carriers, the component carriers of DL_CC1 and UL_CC1 as well as DL_CC2 and UL_CC2 in cell-specific linkage as a pair, respectively, are set to the mobile station apparatus 1. Moreover, the activation of these component carriers is explicitly or implicitly indicated from the base station apparatus 2, so that the mobile station apparatus 1 can use two frequency bands for downlink reception and uplink transmission, respectively. Once a component carrier is activated, the mobile station apparatus 1 needs to receive (monitor) at least one of the physical downlink control channel and the physical downlink shared channel transmitted using the relevant component carrier. In contrast, once the component carrier is deactivated, the mobile station apparatus 1 may not receive (monitor) both the physical downlink control channel and the physical downlink shared channel of the relevant component carrier. The base station apparatus 2 preferably uses a MAC control element that is control information of the MAC, as the activation or deactivation of a component carrier.

Furthermore, as the uplink physical channel setting, a transmission setting of a physical uplink control channel used for a radio resource request (a physical uplink control channel setting for a radio resource request) is set only to UL_CC1. Moreover, a different transmission setting of a random access channel (physical random access channel setting) is made for each uplink component carrier of UL_CC1 and UL_CC2. That is, the mobile station apparatus 1 needs to independently manage the transmission timing adjustment information of UL_CC1 and UL_CC2, the TA timer, and the transmission timing adjustable state/transmission timing non-adjustable state for each component carrier.

It should be noted that, not limited to the example of FIG. 3, the scope of the present invention can be applied if a plurality of uplink component carriers are set in the mobile station apparatus 1 as carrier aggregation and a plurality of physical random access channel settings are set in another uplink component carrier. For example, the uplink and downlink component carriers set as a pair are not cell-specific and the base station apparatus 2 may individually set these component carriers for each mobile station apparatus 1.

Figure 4:
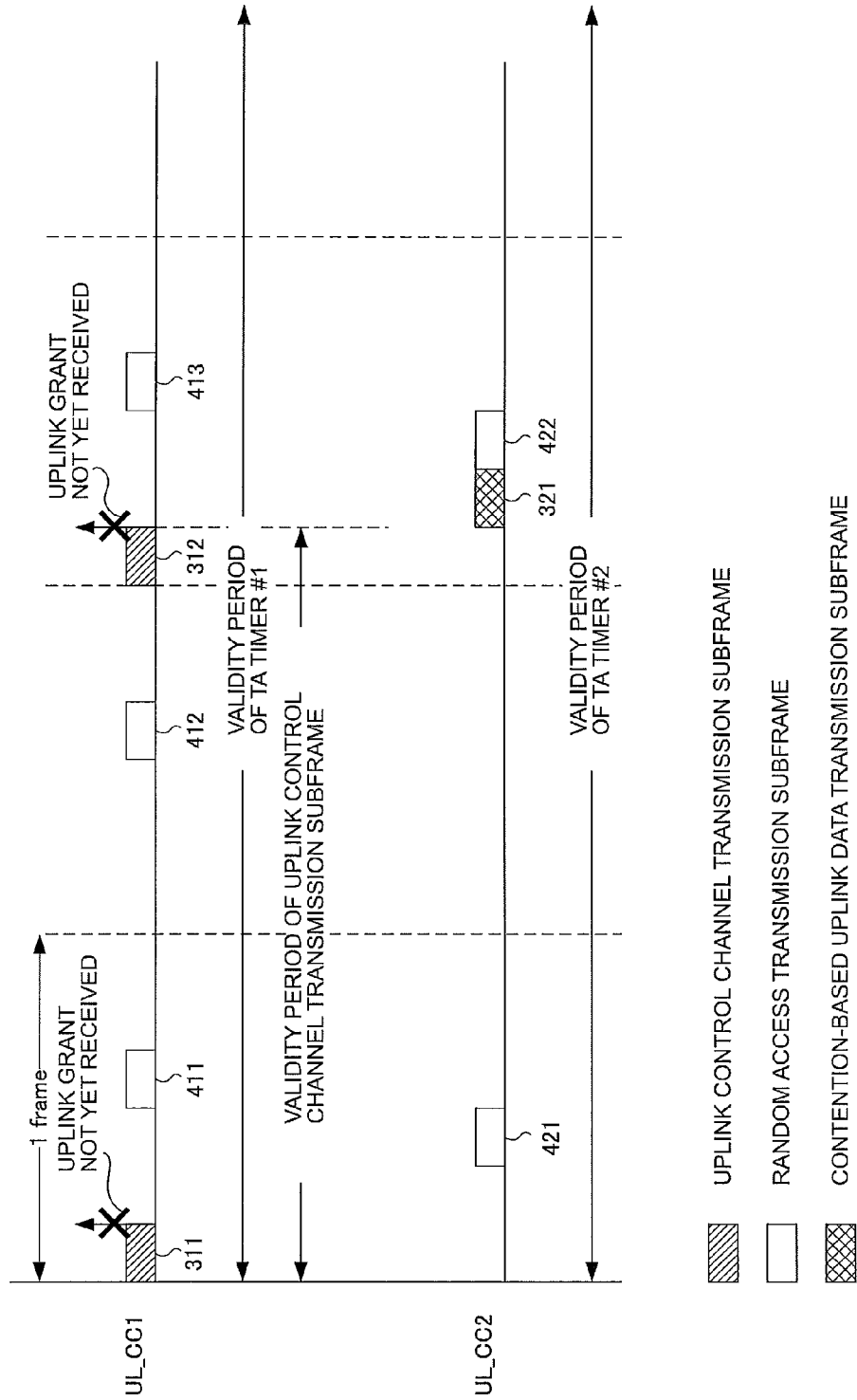
FIG. 4 is a view for illustrating an uplink transmission method of the mobile station apparatus 1 according to a first embodiment of the present invention.

FIG. 4 is a view for illustrating an uplink transmission method of the mobile station apparatus 1 according to the first embodiment of the present invention. The horizontal axis of FIG. 4 represents the passage of time. Physical uplink control channel transmission subframes (311, 312), random access transmission subframes (411-413, 421-422), and a contention-based uplink data transmission subframe 321 in the view indicate the transmission timing (transmission resource) of uplink transmission available to the mobile station apparatus 1, respectively. However, for simplicity of description, a difference between the frequency resources is omitted. One subframe is 1 ms in time, and ten subframes constitute one frame. The base station apparatus 2 allocates a transmission setting for the mobile station apparatus 1 to transmit the physical uplink control channel used for a radio resource request using UL_CC1.

Moreover, the base station apparatus 2 allocates a transmission setting of a random access channel for the mobile station apparatus 1 to transmit a physical random access channel using UL_CC1 and UL_CC2, respectively. Moreover, a TA timer #1 in UL_CC1 is within the validity period, and UL_CC1 is in the transmission timing adjustable state. Similarly, a TA timer #2 in UL_CC2 is within the validity period, and UL_CC2 is in the transmission timing adjustable state.

Then, when uplink transmission data is newly generated in the mobile station apparatus 1, the mobile station apparatus 1, in the validity period of a physical uplink control channel transmission subframe (i.e., a period during which the number of times of transmission of a physical uplink control channel that has been contiguously transmitted for the purpose of the radio resource request until receiving an uplink grant is less than the maximum number of times of transmission), makes a radio resource request to the base station apparatus 2 using the allocated physical uplink control channel (311). However, if the allocation of a radio resource has not been made from the base station apparatus 2 after transmitting the physical uplink control channel (311), a radio resource request is made with respect to the base station apparatus 2 again using a physical uplink control channel (312) in the next transmission chance. In the example of FIG. 4, although the mobile station apparatus 1 meanwhile has a chance to transmit a physical random access channel in random access transmission subframes (411, 412) of UL_CC1 and in a random access transmission subframe (421) of UL_CC2, the mobile station apparatus 1 does not make a radio resource request using a physical random access channel.

If the mobile station apparatus 1 reaches the maximum number of times of transmission of the radio resource request using a physical uplink control channel by having transmitted the next physical uplink control channel (312), the mobile station apparatus 1 regards that the validity period of the physical uplink control channel transmission subframe has ended, and releases the transmission setting of the physical uplink control channel.

Subsequently, the mobile station apparatus 1 needs to transmit a physical random access channel in order to make a radio resource request. However, because the transmission setting of the random access channel is already set to a plurality of uplink component carriers, the mobile station apparatus 1 needs to determine which uplink component carrier is the optimum to transmit the physical random access channel with. The simplest method is to transmit a physical random access channel using the uplink component carrier with which the physical uplink control channel had been transmitted. However, whether or not the transmission setting of the random access channel has been set to the relevant uplink component carrier depends on the settings of the base station apparatus 2, and an exceptional case should be taken into consideration and the processing of the mobile station apparatus 1 becomes complicated. Therefore, an alternative method is preferable. Then, in the first embodiment, the method for selecting an uplink component carrier having the best quality among a plurality of uplink component carriers will be described.

The mobile station apparatus 1, after the validity period of the physical uplink control channel transmission subframe ends (after the physical uplink control channel transmission subframe (312)), measures the path-loss of the downlink reference signal of the downlink component carriers (DL_CC1 and DL_CC2) paired with the uplink component carriers (UL_CC1 and UL_CC2) in which the transmission setting of the random access channel has been made, and selects the uplink component carrier paired with the downlink component carrier whose value of the measured path-loss is the best (having the best reception quality). Then, in the selected uplink component carrier, a radio resource request is made using the physical random access channel. Alternatively, among the uplink component carriers paired with a downlink component carrier whose value of path-loss is better than a predetermined value, one uplink component carrier is selected at random or is selected according to a priority specified from the base station apparatus 2.

By using such a method for selecting an uplink component carrier, the mobile station apparatus 1 can select an uplink component carrier having a good quality based on the value of path-loss. Therefore, the success probability of a radio resource request improves, and a reduction in the transmission power and a reduction in the transmission delay can be achieved at the same time. This method also has an advantage of simplifying the control of the mobile station apparatus 1 because only the value of path-loss is compared. It should be noted that an uplink component carrier may not have a downlink component carrier to be paired with. That is, an uplink component carrier may be selected based on a value that is derived by calculation inside the mobile station apparatus 1 by adding an offset value to the value of path-loss of a certain downlink component carrier.

In FIG. 4, when UL_CC1 has a better quality of the path-loss than UL_CC2 and the mobile station apparatus 1 has selected UL_CC1, a physical random access channel is transmitted in the nearest random access transmission subframe (413) in UL_CC1. However, when a contention-based uplink data transmission subframe (321) is specified from the base station apparatus 2 at a timing earlier than the random access transmission subframe (413), the mobile station apparatus 1 further needs to determine whether or not to perform an uplink transmission in the contention-based uplink data transmission subframe (321).

Then, the mobile station apparatus 1, when having detected the allocation of the contention-based uplink data transmission subframe (321) in the uplink component carrier (UL_CC2) other than the selected uplink component carrier (UL_CC1) and when the detected contention-based uplink data transmission subframe (321) is earlier than the random access transmission subframe (413), determines whether or not a predetermined condition to be described below is satisfied. Then, when the condition is satisfied, the mobile station apparatus 1 performs uplink transmission in the contention-based uplink data transmission subframe (321), while when the predetermined condition is not satisfied, it does not perform uplink transmission in the contention-based uplink data transmission subframe (321).

The predetermined condition is determined by one of or a combination of the followings: (1) the value of path-loss of a downlink component carrier to be paired with is better (or poorer) than a predetermined threshold value; (2) the number of bits of the transmission data of an un-transmitted uplink is equal to or greater than a specified value (or less than a specified value); and (3) the time from the detected contention-based uplink data transmission subframe to a random access transmission subframe is equal to or greater than a specified time. These conditions may be specified for each cell by broadcast information or may be individually specified for each mobile station apparatus using the RRC message from the base station apparatus 2.

In contrast, the mobile station apparatus 1, when having detected the allocation of a contention-based uplink data transmission subframe in the same uplink component carrier as the uplink component carrier which the mobile station apparatus 1 selected, performs uplink transmission in the contention-based uplink data transmission subframe prior to a random access transmission subframe.

Moreover, the mobile station apparatus 1, when a contention-based uplink data transmission subframe has been allocated while waiting for a random access response from the base station apparatus 2, does not perform uplink transmission in the relevant contention-based uplink data transmission subframe regardless of the allocated uplink component carrier. The mobile station apparatus 1, when a contention-based uplink data transmission subframe has been allocated while waiting for the retransmission of the next random access because the mobile station apparatus 1 could not receive the random access response from the base station apparatus 2, cancels the retransmission of the random access regardless of the allocated uplink component carrier and performs uplink transmission in the relevant contention-based uplink data transmission subframe. It should be noted that the mobile station apparatus 1 may consider the above-described conditions in canceling the retransmission of the random access and performing the uplink transmission in the contention-based uplink data transmission subframe. Moreover, the mobile station apparatus 1, while performing random access using a dedicated preamble sequence allocated from the base station apparatus 2, prioritizes random access retransmission processing and does not perform uplink transmission in the contention-based uplink data transmission subframe.

By selecting an uplink transmission method based on such conditions, the uplink transmission with a small delay can be performed without degrading the quality of uplink transmission. Furthermore, in the present invention, with respect to the selection condition of the uplink component carrier for requesting the uplink radio resource required for uplink data transmission and the selection condition as to which to select the radio resource of a physical random access channel or the uplink radio resource common to the mobile station apparatuses 1, the base station apparatus 2 may individually set the above two selection conditions to the mobile station apparatus 1.

Figure 5:
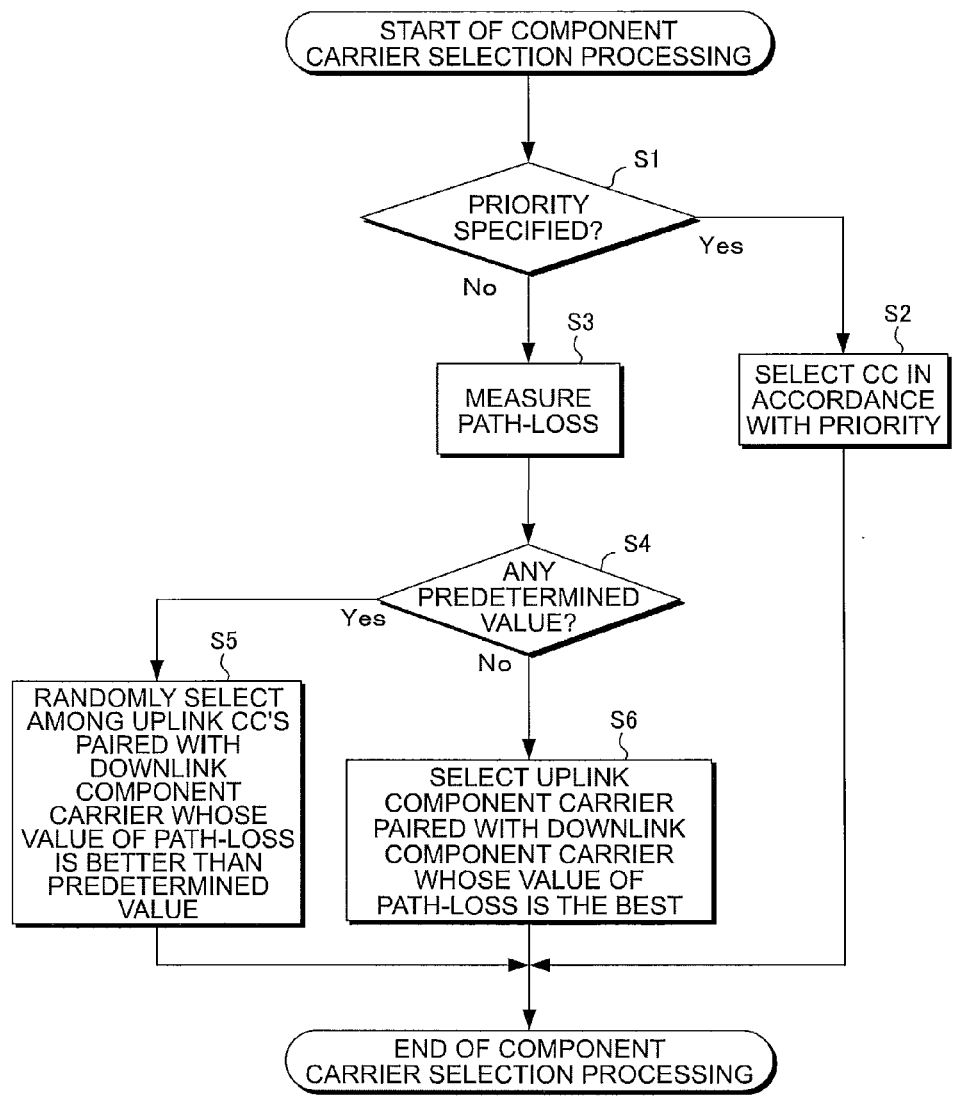
FIG. 5 is a flow chart showing an example of uplink component carrier selection processing of the mobile station apparatus 1 according to the first embodiment of the present invention.

FIG. 5 is a flow chart showing an example of the processing of selecting an uplink component carrier of the mobile station apparatus 1 according to the first embodiment of the present invention. When the transmission setting of a physical uplink control channel used for a radio link request has been released, the mobile station apparatus 1, in selecting a random access transmission component carrier, selects an uplink component carrier for making the radio resource request through the use of a physical random access channel. The selection method is as follows. The mobile station apparatus 1 determines, first, whether or not the priority is specified from the base station apparatus 2 (Step S1). When the priority is specified (Step S1: YES), the mobile station apparatus 1 selects one of the uplink component carriers in accordance with the priority specified from the base station apparatus 2.

When the priority is not specified from the base station (Step S1: NO), the mobile station apparatus 1, after the validity period of a physical uplink control channel transmission subframe ends, measures the path-loss of the downlink reference signal of a downlink component carrier paired with an uplink component carrier, in which the transmission setting of the random access channel has been made (Step S3). Here, it is determined whether or not there is any predetermined value for evaluating the value of path-loss (Step S4). When there is a predetermined value (Step S4: YES), an uplink component carrier is randomly selected among the uplink component carriers paired with a downlink component carrier having a value of path-loss better than the predetermined value (Step S5).

When there is not any predetermined value (Step S4: NO), an uplink component carrier paired with a downlink component carrier having a value of the measured path-loss which is the best (having the best reception quality) is selected (Step S6). In this manner, one uplink component carrier for transmitting a physical random access channel is selected, and the processing is completed. It should be noted that the mobile station apparatus 1 can also omit a part of the above-described steps depending on the component carrier selection processing actually used.

Figure 6:
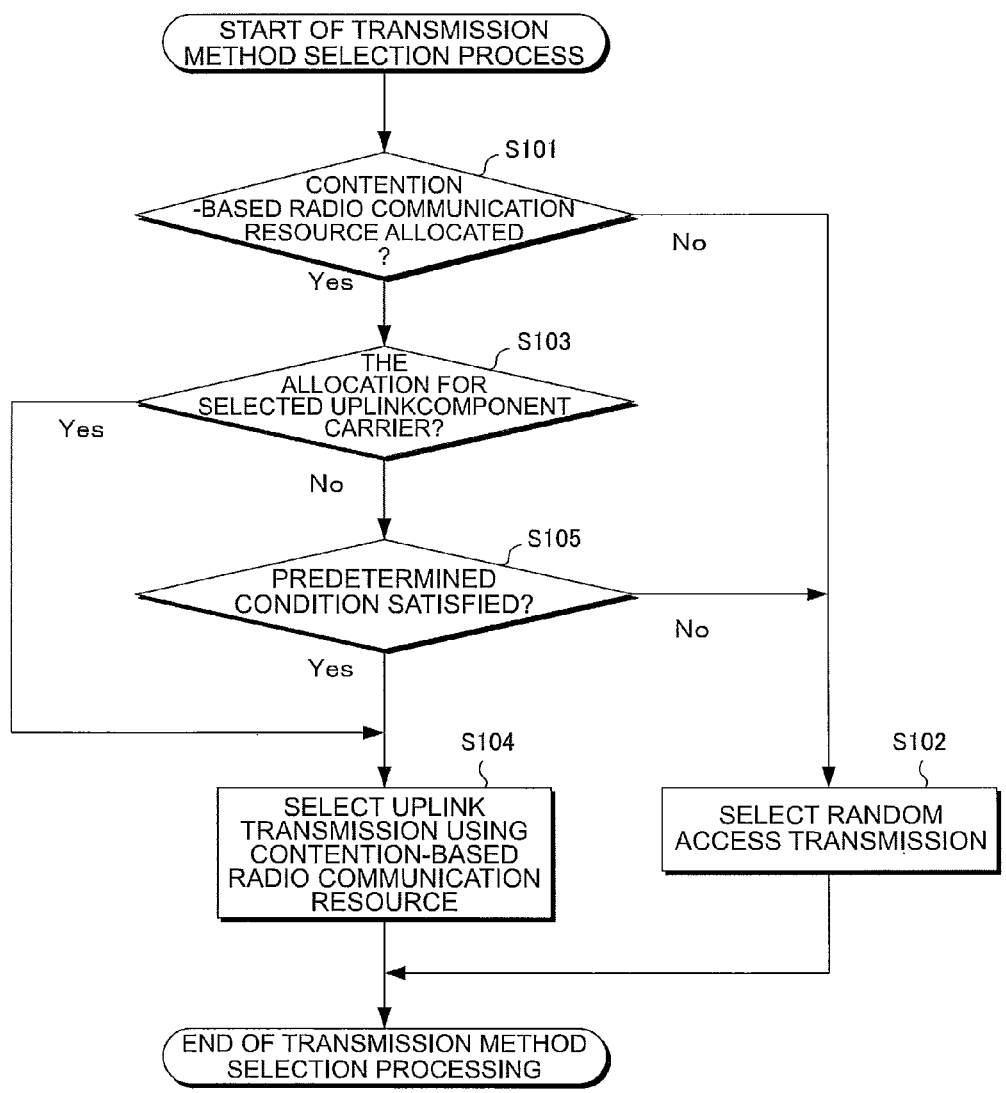
FIG. 6 is a flow chart showing an example of processing of selecting an uplink transmission method of the mobile station apparatus 1 according to the first embodiment of the present invention.

FIG. 6 is a flow chart showing an example of the processing of selecting an uplink transmission method of the mobile station apparatus 1 according to the first embodiment of the present invention. The mobile station apparatus 1 has already selected an uplink component carrier for making a radio resource request through the use of a physical random access channel, by the processing of FIG. 5. Then, the mobile station apparatus 1 determines, before transmitting a physical random access channel, whether or not there is any contention-based radio resource allocation (Step S101). When the contention-based radio resource allocation is not detected (Step S101: NO), a random access transmission is selected (Step S102). When the contention-based radio resource allocation is detected (Step S101: YES), that is, when the contention-based radio resource allocation is detected by the uplink grant of a physical downlink control channel, the mobile station apparatus 1 determines whether or not the allocation of the contention-based radio resource is the allocation to the same uplink component carrier as the selected uplink component carrier (Step S103).

Then, if it is the same uplink component carrier (Step S103: YES), the uplink transmission is performed using the contention-based radio resource without waiting for a radio resource request using a physical random access channel (Step S104). In contrast, if it is the allocation to an uplink component carrier different from the selected uplink component carrier (Step S103: NO), it is determined whether or not a predetermined condition is satisfied (Step S105). When the condition is satisfied (Step S105: YES), the uplink transmission is performed using the contention-based radio resource (Step S104). In contrast, when the condition is not satisfied (Step S105: NO), wait for the transmission subframe of a physical random access channel without performing the uplink transmission (Step S102). The determination of whether or not a predetermined condition is satisfied is made by one of or more of the above-described combinations.

In this manner, in the first embodiment, the mobile station apparatus 1, when a plurality of uplink frequency bands (component carriers) have been set, can select the best uplink component carrier and perform the uplink transmission. Moreover, even when a plurality of methods can be selected in order to transmit new transmission data, the optimum transmission method can be selected. Preferably, the selection of the optimum uplink component carrier is made in the RRC of the mobile station apparatus 1 and is specified from the RRC to the MAC (random access control section 109). Moreover, the base station apparatus 2 transmits a condition, which the mobile station apparatus 1 uses for selection of the optimum uplink component carrier, and a condition, which the mobile station apparatus 1 uses for selection of an uplink transmission method, to the mobile station apparatus 1 using broadcast information or the RRC message As described above, the mobile station apparatus 1, when the uplink radio resource for transmitting uplink data has not been allocated yet, can select the best uplink component carrier based on the reception quality of a downlink component carrier to be paired with. Therefore, the success probability of a radio resource request improves, and a reduction in the transmission power and a reduction in the transmission delay can be achieved at the same time. Moreover, the processing of controlling the mobile station apparatus 1 can be simplified. Moreover, when the mobile station apparatus 1 can select either the radio resource request using a physical random access channel or the contention-based data transmission, the mobile station apparatus 1 can perform the uplink transmission with a small delay without degrading the quality of the uplink transmission, by selecting a transmission method based on a predetermined condition. The base station apparatus 2 can cause the mobile station apparatus 1 to select the optimum transmission method, by the fact that the mobile station apparatus 1 provides notification of various information required to perform the optimum uplink transmission.

<Second Embodiment>

A second embodiment of the present invention will be described below. In the embodiment, a method will be described for selecting an uplink component carrier capable of transmitting a physical random access channel at the earliest timing after the physical random access channel can be transmitted. The configurations of the mobile station apparatus 1 and the base station apparatus 2 used in the embodiment may be the same as the configurations of FIG. 1 and FIG. 2, respectively, and thus the description thereof is omitted. The detail of the embodiment will be described by using FIG. 4. In FIG. 4, until the validity period of a physical uplink control channel transmission subframe ends and then the transmission setting of the physical uplink control channel is released, the operation is the same as the operation of the first embodiment, and thus the description thereof is omitted.

The mobile station apparatus 1, after the validity period of the physical uplink control channel transmission subframe ends (after the physical uplink control channel transmission subframe (312)), selects an uplink component carrier capable of most quickly transmitting a physical random access channel (that is, an uplink component carrier to which a random access transmission subframe is allocated at the earliest timing) among a plurality of uplink component carriers (UL_CC1 and UL_CC2) in which the transmission setting of the random access channel has been made. By using such a method for selecting an uplink component carrier, the mobile station apparatus 1 can most quickly transmit a physical random access channel, and thus can minimize the delay time until the uplink transmission is actually started.

In FIG. 4, because a random access transmission subframe is allocated to UL_CC2 earlier than to UL_CC1, the mobile station apparatus 1 selects UL_CC2 and transmits a physical random access channel by using the random access transmission subframe (422). However, when the contention-based uplink data transmission subframe (321) is specified from the base station apparatus 2 at a timing earlier than the random access transmission subframe (422), the mobile station apparatus 1 further needs to determine whether or not to perform an uplink transmission in this contention-based uplink data transmission subframe (321). In determining whether or not the mobile station apparatus 1 transmits uplink data using a contention-based radio resource, the method shown in the first embodiment can be used.

Furthermore, when the transmission timings of the random access transmission subframe of different uplink component carriers are the same, the mobile station apparatus 1 selects one optimum uplink component carrier by judging from the number of bits of the uplink data to transmit and the value of path-loss of the downlink component carrier to be paired with. Specifically, the mobile station apparatus 1, when the number of bits of the uplink data to transmit is equal to or greater than a predetermined number of bits, selects the best uplink component carrier, wherein the value of path-loss of a downlink component carrier to be paired with is equal to or greater than the predetermined threshold value. In contrast, the mobile station apparatus 1, when the number of bits of the uplink data to transmit is less than the predetermined number of bits, may select the best uplink component carrier, wherein the value of path-loss of a downlink component carrier to be paired with is equal to or greater than the predetermined threshold value, or may randomly select one uplink component carrier. Processing of selecting an uplink component of the mobile station apparatus 1 in the second embodiment is shown in FIG. 7.

Figure 7:
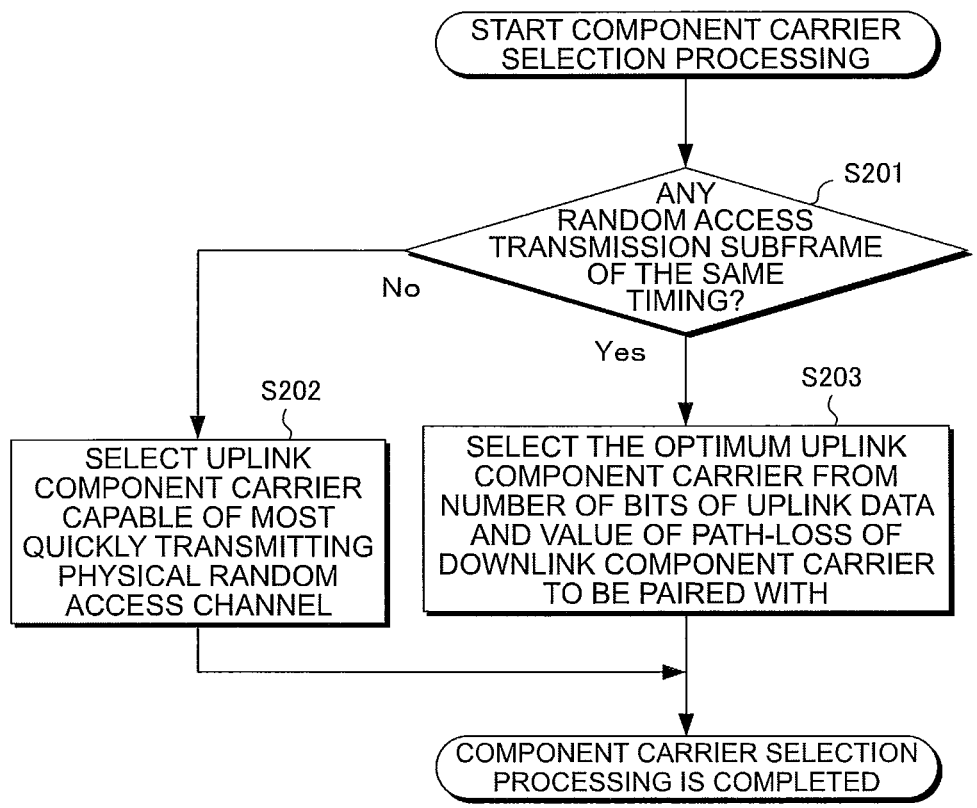
FIG. 7 is a flow chart showing component carrier selection processing according to a second embodiment of the present invention.

FIG. 7 is a flow chart showing component carrier selection processing according to the second embodiment of the present invention. First, the mobile station apparatus 1 determines whether or not there is any random access transmission subframe having the same timing (Step S201). When the timings differ (Step S201: NO), an uplink component carrier capable of most quickly transmitting a physical random access channel is selected (Step S202).

When the transmission timings of the random access transmission subframe of different uplink component carriers are the same (Step S201: YES), the mobile station apparatus 1 selects one optimum uplink component carrier from the number of bits of the uplink data to transmit and the value of path-loss of the downlink component carrier to be paired with (Step S203). However, the selection of a random access transmission component carrier is made based on the timing at which the physical random access channel can be transmitted. The processing of selecting an uplink transmission method of the mobile station apparatus 1 in the second embodiment may be the same as the flow chart shown in FIG. 6.

Moreover, in the embodiment, a case will be described, where the mobile station apparatus 1, while not receiving a response (a random access response) of a physical random access channel, which has been transmitted using the selected uplink component carrier, and waiting for the retransmission of the random access, reselects other uplink component carrier and performs the random access. The mobile station apparatus 1, while waiting for reception of a random access response, will not reselect other uplink component carrier. That the mobile station apparatus 1 changes the uplink component carrier for performing random access is effective when the frequency of allocation of a random access transmission subframe differs, as shown in FIG. 4. That is, in the example of FIG. 4, after the mobile station apparatus 1 transmits a physical random access channel using the random access transmission subframe (422) of UL_CC2, the next transmission chance comes two frames late. However, if a physical random access channel can be transmitted in the random access transmission subframe (413) of UL_CC1 prior to the next transmission chance in UL_CC2, the time actually required before the uplink transmission can be reduced.

The mobile station apparatus 1, as the judgment whether or not the uplink component carrier for transmitting a physical random access channel is switched, compares the uplink component carrier (UL_CC2) currently being selected with the uplink component carrier (UL_CC1) serving as a candidate to be switched, according to the following reselection conditions. Specifically, when either one of the followings is satisfied: (1) the value of path-loss of a downlink component carrier paired with an uplink component carrier serving as the candidate is better than a predetermined threshold value; (2) the value of path-loss of a downlink component carrier paired with an uplink component carrier serving as the candidate is better than the value of path-loss of a downlink component carrier paired with an uplink component carrier currently being selected; and (3) the time from the random access transmission subframe of an uplink component carrier serving as the candidate to the random access transmission subframe next to the uplink component carrier currently being selected is equal to or greater than a specified time, the current random access is canceled and the uplink component carrier for transmitting a physical random access channel is switched.

Moreover, the mobile station apparatus 1, when a contention-based uplink data transmission subframe has been allocated in a state of waiting for a random access response from the base station apparatus 2, does not perform uplink transmission in the relevant contention-based uplink data transmission subframe regardless of the allocated uplink component carrier. When a contention-based uplink data transmission subframe has been allocated in a state of waiting for the retransmission of the next random access because the mobile station apparatus 1 was not able to receive the random access response from the base station apparatus 2, the mobile station apparatus 1 cancels the retransmission of the random access regardless of the allocated uplink component carrier and performs uplink transmission by using the relevant contention-based uplink data transmission subframe. Furthermore, the mobile station apparatus 1, when performing random access by using a dedicated preamble sequence allocated from the base station apparatus 2, prioritizes the random access retransmission processing and does not perform uplink transmission in the contention-based uplink data transmission subframe. It should be noted that the mobile station apparatus 1 may consider the above-described conditions before canceling the retransmission of the random access and performing the uplink transmission in the contention-based uplink data transmission subframe.

Figure 8:
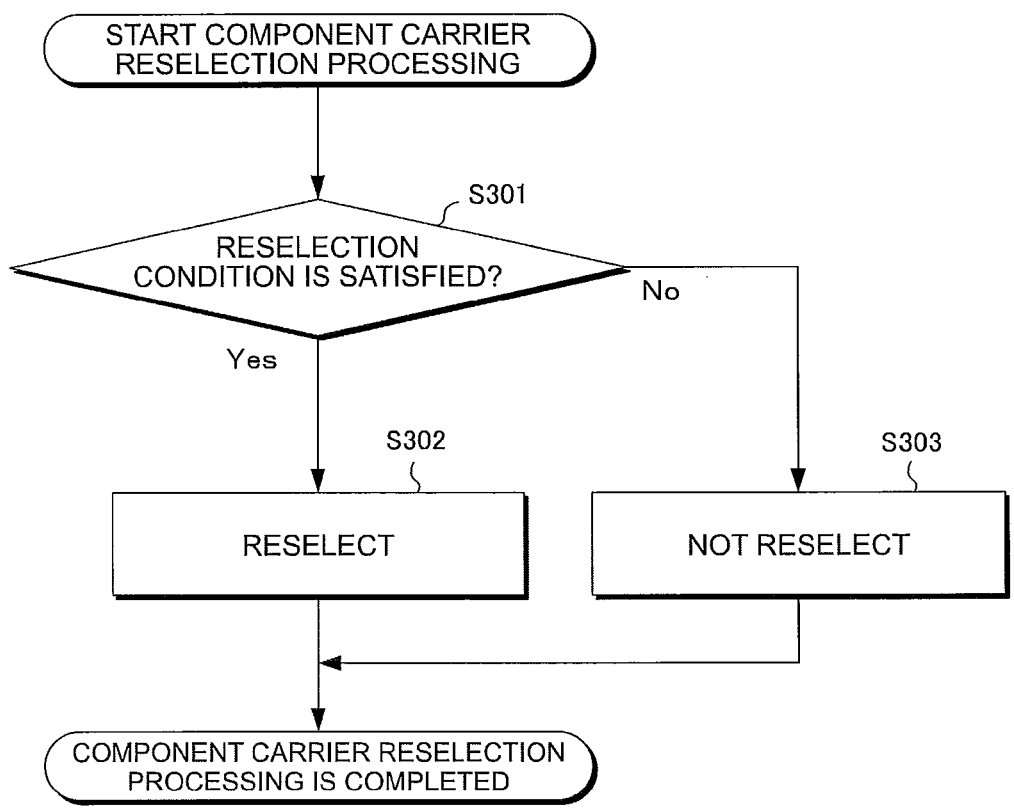
FIG. 8 is a flow chart showing an example of processing of reselecting an uplink component carrier of the mobile station apparatus 1 according to the second embodiment of the present invention.

FIG. 8 is a flow chart showing an example of the processing of selecting an uplink component carrier of the mobile station apparatus 1 according to the second embodiment of the present invention. When the random access transmission subframe is allocated to other uplink component carrier in a state of not receiving a random access response of the uplink component carrier selected in FIG. 5 and FIG. 7 and in a state of waiting for the retransmission of the next random access, the mobile station apparatus 1 determines whether or not the relevant uplink component carrier satisfies a reselection condition (Step S301). As the reselection condition, either one of the above-described methods is used. Then, when the reselection condition is satisfied (Step S301: YES), the current random access is canceled, the uplink component carrier is reselected, and the processing is completed (Step S302). In contrast, when the reselection condition is not satisfied (Step S301: NO), the processing is completed without switching the uplink component carrier (Step S303).

In this manner, in the second embodiment, the mobile station apparatus 1, when a plurality of uplink frequency bands (component carriers) have been set, can select the optimum uplink component carrier and perform the uplink transmission. Furthermore, even when a plurality of methods can be selected in order to transmit new transmit data, the optimum transmission method can be selected. Moreover, the mobile station apparatus 1 can also appropriately switch the uplink component carrier for transmitting a physical random access channel, based on the predetermined conditions. Preferably, the selection and switching of the optimum uplink component carrier, the processing of canceling a random access, and the processing of resetting the transmission setting of a random access channel are performed by the RRC of the mobile station apparatus 1 and are specified from the RRC to the MAC (random access control section 109). Moreover, the base station apparatus 2 transmits a condition, which the mobile station apparatus 1 uses for selection of the optimum uplink component carrier, and a condition, which the mobile station apparatus 1 uses for selection of an uplink transmission method, to the mobile station apparatus 1 using broadcast information or an RRC message.

As described above, the mobile station apparatus 1, when the uplink radio resource for transmitting uplink data is not allocated, can select a physical random access channel capable of most quickly transmitting an uplink component carrier, and thus the transmission delay until uplink transmission can be reduced. Furthermore, the mobile station apparatus 1 can reduce the transmission delay by switching the uplink component carrier for performing the random access when a predetermined condition is satisfied. Moreover, when the mobile station apparatus 1 can select either the radio resource request by using a physical random access channel or the contention-based data transmission, the mobile station apparatus 1 can perform the uplink transmission having a small delay without degrading the quality of the uplink transmission, by selecting a transmission method based on a predetermined condition. The base station apparatus 2 can cause the mobile station apparatus 1 to select the optimum transmission method, by the fact that the mobile station apparatus 1 provides notification of various information required to perform the optimum uplink transmission.

<Third Embodiment>

A third embodiment of the present invention will be described below. In the embodiment, a method capable of selecting a more appropriate uplink transmission by adding an uplink transmission timing to the selection criteria in addition to the first embodiment and the second embodiment will be described. The configurations of the mobile station apparatus 1 and the base station apparatus 2 used in the embodiment may be the same as the configurations of FIG. 1 and FIG. 2, respectively, and thus the description thereof is omitted.

Figure 9:
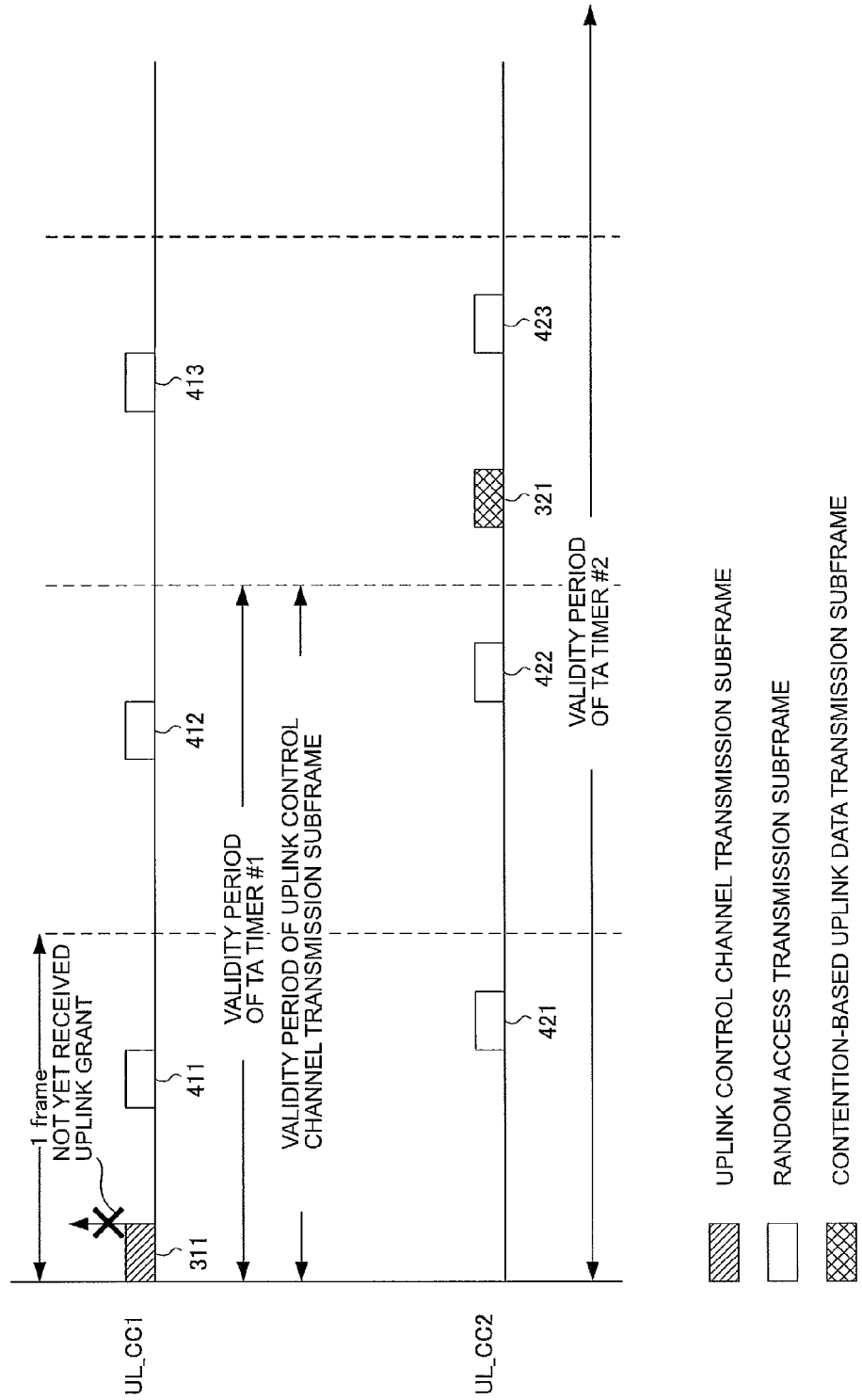
FIG. 9 is a view for illustrating an uplink transmission method of the mobile station apparatus 1 according to a third embodiment of the present invention.

FIG. 9 is a view for illustrating an uplink transmission method of the mobile station apparatus 1 according to the third embodiment of the present invention. In FIG. 9, for those already described in FIG. 4, the same symbol is arranged and the description thereof is omitted. In FIG. 9, a TA timer #1 in UL_CC1 expires halfway, and then UL_CC1 goes into a transmission timing non-adjustable state. In contrast, a TA timer #2 in UL_CC2 is within the validity period, and UL_CC2 is in the transmission timing adjustable state. At this time, the mobile station apparatus 1 needs to transmit a physical random access channel in order to make a radio resource request, but because the transmission setting of the random access channel is already set to a plurality of uplink component carriers, the mobile station apparatus 1 needs to determine with which uplink component carrier, it is optimum to transmit a physical random access channel. In particular, the mobile station apparatus 1 needs to determine whether or not to transmit a physical random access channel with an uplink component carrier, the TA timer of which expires and which goes into a transmission timing non-adjustable state.

Then, in the third embodiment, a selection method will be described, wherein an uplink component carrier having a TA timer within the validity period is taken into consideration in addition to the first embodiment or the second embodiment. That is, the mobile station apparatus 1, when selecting an uplink component carrier based on the path-loss as with the first embodiment, excludes the uplink component carrier in the transmission timing non-adjustable state from the selection candidates. Similarly, the mobile station apparatus 1, when selecting an uplink component carrier based on the allocation of a random access transmission subframe as with the second embodiment, excludes the uplink component carrier in the transmission timing non-adjustable state from the selection candidates. The mobile station apparatus 1, with respect to uplink component carriers other than the uplink component carrier removed from the selection candidates, subsequently selects the optimum uplink component carrier and the optimum uplink transmission method using the first embodiment or the second embodiment. The mobile station apparatus 1 does not select the uplink component carrier in the transmission timing non-adjustable state and thus makes a radio resource request without activating an additional TA timer associated with uplink transmission and thus the processing of controlling the mobile station apparatus 1 is simplified.

Moreover, because the reception quality of a downlink component carrier has degraded, the mobile station apparatus 1 may remove an uplink component carrier paired with a downlink component carrier having a degraded reception quality and thus having a downlink problem (radio link problem) or a downlink component carrier failure (cc failure), from the selection candidates. Similarly, the mobile station apparatus 1 may also remove an uplink component carrier paired with the deactivated downlink component carrier, from the selection candidates. Alternatively, when the mobile station apparatus 1 has selected an uplink component carrier paired with the deactivated downlink component carrier, the reception (monitoring) of either one of a physical downlink control channel and a physical downlink shared channel of the relevant component carrier may be resumed in order to activate the deactivated downlink component carrier upon uplink transmission and receive a response of the uplink transmission. Moreover, when a radio resource for performing the contention-based data transmission specified by an uplink grant indicates an uplink component carrier in the transmission timing non-adjustable state, the mobile station apparatus 1 will not perform the contention-based data transmission with this radio resource.

In this manner, in the third embodiment, the mobile station apparatus 1 can select an uplink component carrier taking into consideration whether or not the transmission timing of an uplink component carrier has been adjusted. As described above, the mobile station apparatus 1, when the uplink radio resource for transmitting uplink data is not allocated, can select the best uplink component carrier taking into consideration whether or not the transmission timing of an uplink component carrier has been adjusted. Accordingly, the mobile station apparatus 1 can make a radio resource request without activating an additional TA timer associated with uplink transmission and thus the processing of controlling the mobile station apparatus 1 is simplified.

(A) A mobile station apparatus of the present invention is the one aggregating a plurality of frequency bands to connect the same to a base station apparatus and requesting, from the base station apparatus, an uplink radio resource required to transmit uplink data, wherein the mobile station apparatus selects: based on a first condition, a frequency band of an uplink for making a radio resource request using a physical random access channel is selected from any of the frequency bands, and based on a second condition, either the radio resource request using the physical random access channel or the transmission of uplink data by using an uplink radio resource common to other mobile station apparatuses.

In this manner, the mobile station apparatus, based on the first condition, selects a frequency band of an uplink for making a radio resource request using a physical random access channel from the plurality of frequency bands, while based on the second condition, the mobile station apparatus selects either the radio resource request using the physical random access channel or the transmission of uplink data by using an uplink radio resource common to other mobile station apparatus, and thus an uplink component carrier with a good quality can be selected based on the value of path-loss. Furthermore, the success probability of a radio resource request improves, and a reduction in the transmission power and a reduction in the transmission delay can be achieved at the same time. This method also has an advantage of simplifying the control of a mobile station apparatus because only the value of path-loss is compared.

(B) In addition, in the mobile station apparatus of the present invention, the first condition is that a transmission setting of a random access channel is already made and that the frequency band of the uplink corresponds to a frequency band of a downlink having the best reception quality.

In this manner, the first condition is that a transmission setting of a random access channel is already made and that the frequency band of the uplink corresponds to a frequency band of a downlink having the best reception quality, and thus the mobile station apparatus can select an uplink component carrier with a good quality based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared.

(C) Furthermore, in the mobile station apparatus of the present invention, the first condition is that a transmission setting of a random access channel is already made and that the relevant frequency band of the uplink is the frequency band of an uplink capable of most quickly transmitting a physical random access channel.

In this manner, the first condition is that a transmission setting of a random access channel is already made and that the relevant frequency band of the uplink is the frequency band of an uplink capable of most quickly transmitting a physical random access channel, and thus the mobile station apparatus can most quickly transmit a physical random access channel and thus can minimize the delay time until the uplink transmission is actually started.

(D) Moreover, in the mobile station apparatus of the present invention, the first condition is that a transmission setting of a random access channel is already made and that the relevant frequency band of an uplink corresponds to a frequency band of a downlink having the best reception quality among frequency bands of an uplink capable of most quickly transmitting a physical random access channel.

In this manner, the first condition is that a transmission setting of a random access channel is already made and that the relevant frequency band of an uplink corresponds to a frequency band of a downlink having the best reception quality among frequency bands of an uplink capable of most quickly transmitting a physical random access channel, and thus the mobile station apparatus can select an uplink component carrier with a good quality based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared. Moreover, the mobile station apparatus can most quickly transmit a physical random access channel and thus can minimize the delay time until the uplink transmission is actually started.

(E) Furthermore, in the mobile station apparatus of the present invention, the first condition includes the fact that a transmission timing of an uplink between the mobile station apparatus and the base station apparatus is already adjusted.

In this manner, the first condition includes that a transmission timing of an uplink between the mobile station apparatus and the base station apparatus is already adjusted, and thus the mobile station apparatus does not select the uplink component carrier in the transmission timing non-adjustable state. Accordingly, the mobile station apparatus can make a radio resource request without activating an additional TA timer associated with uplink transmission, so that the processing of controlling the mobile station apparatus is simplified.

(F) In addition, in the mobile station apparatus of the present invention, the second condition is that when, to the frequency band of an uplink selected based on the first condition, an uplink radio resource common to other mobile station apparatuses has been allocated prior to a physical random access channel, the transmission of an uplink data with the uplink radio resource is selected, while when the uplink radio resource common to other mobile station apparatuses has not been allocated prior to a physical random access channel, a radio resource request using the physical random access channel is selected.

In this manner, when to the frequency band of an uplink selected based on the first condition, an uplink radio resource common to other mobile station apparatuses has been allocated prior to a physical random access channel, the transmission of an uplink data with the uplink radio resource is selected, while when the uplink radio resource common to other mobile station apparatuses has not been allocated prior to a physical random access channel, a radio resource request using the physical random access channel is selected, and thus an uplink transmission with a small delay cam be performed without degrading the quality of uplink transmission.

(G) Moreover, in the mobile station apparatus of the present invention, the second condition is that with respect to an uplink frequency band corresponding to a frequency band of a downlink having a reception quality satisfying a predetermined threshold value, the uplink frequency band being other than the uplink frequency band selected based on the first condition, when an uplink radio resource common to other mobile station apparatuses has been allocated earlier than the physical random access channel allocated to the selected uplink frequency band, the transmission of an uplink data with the uplink radio resource is selected, while with respect to an uplink frequency band corresponding to a frequency band of a downlink having a reception quality satisfying a predetermined threshold value, the uplink frequency band being other than the uplink frequency band selected based on the first condition, when the uplink radio resource common to other mobile station apparatuses has not been allocated earlier than the physical random access channel allocated to the selected uplink frequency band, a radio resource request using the physical random access channel is selected.

In this manner, with respect to an uplink frequency band corresponding to a frequency band of a downlink having a reception quality satisfying a predetermined threshold value, the uplink frequency band being other than the uplink frequency band selected based on the first condition, when an uplink radio resource common to other mobile station apparatuses has been allocated earlier than the physical random access channel allocated to the selected uplink frequency band, the transmission of an uplink data with the uplink radio resource is selected, while with respect to an uplink frequency band corresponding to a frequency band of a downlink having a reception quality satisfying a predetermined threshold value, the uplink frequency band being other than the uplink frequency band selected based on the first condition, when the uplink radio resource common to other mobile station apparatuses has not been allocated earlier than the physical random access channel allocated to the selected uplink frequency band, a radio resource request using the physical random access channel is selected, and thus an uplink transmission with a small delay cam be performed without degrading the quality of uplink transmission.

(H) Furthermore, the base station apparatus of the present invention individually sets the first condition and the second condition to the mobile station apparatus according to any of (A) to (G) described above.

In this manner, the first condition and the second condition are individually set to the mobile station apparatus according to any one of (A) through (G) described above, and thus the mobile station apparatus can select an uplink component carrier with a good quality based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared.

(I) In addition, a communication system of the present invention is the one, in which a base station apparatus and a mobile station apparatus are connected to each other through aggregation of a plurality of frequency bands and in which the mobile station apparatus requests, from the base station apparatus, an uplink radio resource required to transmit uplink data, wherein the base station apparatus individually sets a first condition and a second condition to the mobile station apparatus, and wherein the mobile station apparatus, based on the first condition, selects a frequency band of an uplink for making a radio resource request using a physical random access channel, from the plurality of frequency bands, while based on a second condition, the mobile station apparatus selects either the radio resource request using the physical random access channel or the transmission of uplink data by using an uplink radio resource common to other mobile station apparatuses.

In this manner, the mobile station apparatus, based on the first condition, selects a frequency band of an uplink for making a radio resource request using a physical random access channel, from the plurality of frequency bands, while based on a second condition, the mobile station apparatus selects either the radio resource request using the physical random access channel or the transmission of uplink data by using an uplink radio resource common to other mobile station apparatuses. Therefore, an uplink component carrier with a good quality can be selected based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared.

(J) Furthermore, in the communication system of the present invention, the first condition is that a transmission setting of a random access channel is already made and that the frequency band of the uplink corresponds to a frequency band of a downlink having the best reception quality.

In this manner, the first condition is that a transmission setting of a random access channel is already made and that the frequency band of the uplink corresponds to a frequency band of a downlink having the best reception quality, and thus the mobile station apparatus can select an uplink component carrier with a good quality based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared.

(K) Moreover, in the communication system of the present invention, the first condition is that a transmission setting of a random access channel is already made and that the relevant frequency band of the uplink is the frequency band of an uplink capable of most quickly transmitting a physical random access channel.

In this manner, the first condition is that a transmission setting of a random access channel is already made and that the relevant frequency band of the uplink is the frequency band of an uplink capable of most quickly transmitting a physical random access channel, and thus the mobile station apparatus can most quickly transmit a physical random access channel and thus can minimize the delay time until the uplink transmission is actually started.

(L) In addition, in the communication system of the present invention, the first condition is that a transmission setting of a random access channel is already made and that the relevant frequency band of an uplink corresponds to a frequency band of a downlink having the best reception quality among frequency bands of an uplink capable of most quickly transmitting a physical random access channel.

In this manner, the first condition is that a transmission setting of a random access channel is already made and that the relevant frequency band of an uplink corresponds to a frequency band of a downlink having the best reception quality among frequency bands of an uplink capable of most quickly transmitting a physical random access channel, and thus the mobile station apparatus can select an uplink component carrier with a good quality based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared. Moreover, the mobile station apparatus can most quickly transmit a physical random access channel and thus can minimize the delay time until the uplink transmission is actually started.

(M) Furthermore, in the communication system of the present invention, the first condition includes the fact that a transmission timing of an uplink between the mobile station apparatus and the base station apparatus is already adjusted.

In this manner, the first condition includes that a transmission timing of an uplink between the mobile station apparatus and the base station apparatus is already adjusted, and thus the mobile station apparatus does not select the uplink component carrier in the transmission timing non-adjustable state and thus the mobile station apparatus can make a radio resource request without activating an additional TA timer associated with uplink transmission, so that the processing of controlling the mobile station apparatus is simplified.

(N) Moreover, in the communication system of the present invention, the second condition is that when, to the frequency band of an uplink selected based on the first condition, an uplink radio resource common to other mobile station apparatuses has been allocated prior to a physical random access channel, the transmission of an uplink data with the uplink radio resource is selected, while when the uplink radio resource common to other mobile station apparatuses has not been allocated prior to a physical random access channel, the radio resource request using the physical random access channel is selected.

In this manner, when, to the frequency band of an uplink selected based on the first condition, an uplink radio resource common to other mobile station apparatuses has been allocated prior to a physical random access channel, the transmission of an uplink data with the uplink radio resource is selected, while when the uplink radio resource common to other mobile station apparatuses has not been allocated prior to a physical random access channel, the radio resource request using the physical random access channel is selected, and thus the mobile station apparatus can perform an uplink transmission with a small delay without degrading the quality of uplink transmission.

(O) In addition, in the communication system of the present invention, the second condition is that with respect to an uplink frequency band corresponding to a frequency band of a downlink having a reception quality satisfying a predetermined threshold value, the uplink frequency band being other than the uplink frequency band selected based on the first condition, when an uplink radio resource common to other mobile station apparatuses has been allocated earlier than the physical random access channel allocated to the selected uplink frequency band, the transmission of an uplink data with the uplink radio resource is selected, while, with respect to an uplink frequency band corresponding to a frequency band of a downlink having a reception quality satisfying a predetermined threshold value, the uplink frequency band being other than the uplink frequency band selected based on the first condition, when the uplink radio resource common to other mobile station apparatuses has not been allocated earlier than the physical random access channel allocated to the selected uplink frequency band, the radio resource request using the physical random access channel is selected.

In this manner, with respect to an uplink frequency band corresponding to a frequency band of a downlink having a reception quality satisfying a predetermined threshold value, the uplink frequency band being other than the uplink frequency band selected based on the first condition, when an uplink radio resource common to other mobile station apparatuses has been allocated earlier than the physical random access channel allocated to the selected uplink frequency band, the transmission of an uplink data with the uplink radio resource is selected, while with respect to an uplink frequency band corresponding to a frequency band of a downlink having a reception quality satisfying a predetermined threshold value, the uplink frequency band being other than the uplink frequency band selected based on the first condition, when the uplink radio resource common to other mobile station apparatuses has not been allocated earlier than the physical random access channel allocated to the selected uplink frequency band, the radio resource request using the physical random access channel is selected. Therefore, the mobile station apparatus can perform an uplink transmission with a small delay without degrading the quality of uplink transmission.

(P) Furthermore, a communication method of the present invention is the one, in which a base station apparatus and a mobile station apparatus are connected to each other through aggregation of a plurality of frequency bands and in which the mobile station apparatus requests, from the base station apparatus, an uplink radio resource required to transmit uplink data, the communication method comprising at least the steps of: in the base station apparatus, individually setting a first condition and a second condition to the mobile station apparatus, and in the mobile station apparatus, selecting, based on the first condition, a frequency band of an uplink for making a radio resource request using a physical random access channel from any of the frequency bands; and selecting, based on the second condition, either the radio resource request using the physical random access channel or the transmission of uplink data using an uplink radio resource common to other mobile station apparatuses.

In this manner, the mobile station apparatus, selects, based on the first condition, a frequency band of an uplink for making a radio resource request using a physical random access channel from the plurality of frequency bands; and selects, based on the second condition, either the radio resource request using the physical random access channel or the transmission of uplink data using an uplink radio resource common to other mobile station apparatus, and thus an uplink component carrier with a good quality can be selected based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared.

(Q) Moreover, an integrated circuit of the present invention is the one causing a mobile station apparatus to exert a plurality of functions by being implemented in the mobile station apparatus, the integrated circuit including a series of functions of: aggregating a plurality of frequency bands to connect the same to a base station apparatus; requesting, from the base station apparatus, an uplink radio resource required to transmit uplink data; selecting, based on the first condition, a frequency band of an uplink for making a radio resource request using a physical random access channel from any of the frequency bands; and selecting, based on the second condition, either the radio resource request using the physical random access channel or a transmission of uplink data by using the uplink radio resource common to other mobile station apparatuses.

In this manner, the mobile station apparatus selects, based on the first condition, a frequency band of an uplink for making a radio resource request using a physical random access channel from the plurality of frequency bands, while based on the second condition, the mobile station apparatus selects either the radio resource request using the physical random access channel or the transmission of uplink data by using an uplink radio resource common to other mobile station apparatus, and thus an uplink component carrier with a good quality can be selected based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared.

(R) In addition, a mobile station apparatus control program of the present invention is the one for aggregating a plurality of frequency bands to connect the same to a base station apparatus and requesting, from the base station apparatus, an uplink radio resource required to transmit uplink data, wherein the control program converts a series of processing into commands so as to enable a computer to read and execute them, the series of processing including processing of: requesting, from the base station apparatus, an uplink radio resource required to transmit uplink data; selecting, based on a first condition, a frequency band of an uplink for making a radio resource request using a physical random access channel from any of the frequency bands; and selecting, based on a second condition, either the radio resource request using the physical random access channel or the transmission of uplink data by using an uplink radio resource common to other mobile station apparatuses.

In this manner, the mobile station apparatus, selects, based on a first condition, a frequency band of an uplink for making a radio resource request using a physical random access channel from the plurality of frequency bands, while based on a second condition, the mobile station apparatus selects either the radio resource request using the physical random access channel or the transmission of uplink data by using an uplink radio resource common to other mobile station apparatus, and thus an uplink component carrier with a good quality can be selected based on the value of path-loss. Moreover, the success probability of a radio resource request improves, and a reduction in the transmission power and a reduction in the transmission delay can be achieved at the same time. This method also has an advantage of simplifying the control of a mobile station apparatus because only the value of path-loss is compared.

It should be noted that, the embodiments described above are merely exemplifications, and can be realized using various variations or substitutions. For example, the present uplink transmission scheme can be applied to both a communication system with a FDD (frequency-division duplex) scheme and a communication system with a TDD (time-division duplex) scheme. Moreover, in each embodiment, an example using the path-loss as the measured value of a downlink component carrier has been described, but the other measurement value (SIR, SINR, RSRP, RSRQ, RSSI, or BLER) may be used instead, or a combination of multiple of these measurement values can be also used. Moreover, for convenience of description, the mobile station apparatus 1 and the base station apparatus 2 of the embodiments have been described using a functional block diagram, but by recording a program for realizing the function of or a part of the function of each section of the mobile station apparatus 1 and the base station apparatus 2 onto a computer readable recording medium, and causing a computer system to read and execute the program recorded on this recording medium, the mobile station apparatus 1 and the base station apparatus 2 may be controlled. It should be noted that, "computer system" herein includes an OS and/or hardware, such as peripheral devices.

Moreover, the "computer readable recording medium" refers to portable media, such as semiconductor media (e.g., a RAM, a nonvolatile memory card, etc.), optical recording media (e.g., DVD, MO, MD, CD, BD, etc.), and magnetic recording media (e.g., a magnetic tape, a flexible disk, etc.), and to storage devices, such as a disk device built in a computer system. Furthermore, the "computer readable recording medium" includes those dynamically retaining a program for a short time, such as communication wires when a program is transmitted via a network, such as the Internet, or communication lines, such as telephone lines, and those retaining a program for a certain time, such as a volatile memory inside a computer system serving as a server or a client. The above-described program may be the one for realizing some of the above-described functions, or further may be the one capable of realizing the above-described functions in combination with a program already stored on a computer system.

Each functional block or various features of the mobile station apparatus 1 and the base station apparatus 2 used in each embodiment described above may be configured inside a circuit including an LSI that is typically an IC (integrated circuit). In this case, the integration density of the LSI may be realized at any density. Each functional block and various features may be individually formed into a chip or some of or all thereof may be formed into a chip. Moreover, the integration approach is not limited to the LSI but may be realized by an application specific circuit or a general-purpose processor. Moreover, if an integration technology replacing the LSI would have emerged due to a progress in the semiconductor technologies, an integrated circuit using this technique may be used.

In the foregoing, the embodiments of the present invention have been described in detail based on specific examples, but it should be clear that the scope of the present invention and the claims are not limited to these specific examples. That is, the description herein is just for illustration only, and does not put any restriction on the present invention.

DESCRIPTION OF SYMBOLS 11-13 transmitter
21-23 receiver
1 mobile station apparatus
2 base station apparatus
101 receiving section
103 demodulation section
105 decoding section
107 measurement processing section
109 random access control section
111 encoder section
113 modulation section
115 transmission section
117 control section
119 higher layer
201 receiving section
203 demodulation section
205 decoding section
207 higher layer
209 encoder section
211 modulation section
213 transmission section
215 control section
217 network signal transmitting/receiving section

The invention claimed is:

1. A mobile station apparatus using a plurality of cells aggregated to connect to a base station apparatus, the mobile station apparatus comprising:
a circuitry configured to and/or programmed to determine, a cell from among the plurality of cells aggregated, the cell determined based on first information which is transmitted from the base station apparatus to the mobile station apparatus by a Radio Resource Control (RRC) message,
the first information including a transmission setting of a random access channel on an uplink of the cell,
the cell used to transmit a request an uplink radio resource which is required to transmit uplink data, and
the random access channel for the radio resource request based on second information not including an uplink control channel resource for the radio resource request,
the second information being transmitted from the base station apparatus to the mobile station apparatus by the RRC message.

2. A base station apparatus using a plurality of cells aggregated to connect to a mobile station apparatus, the base station apparatus comprising:
a transmission circuitry configured to and/or programmed to transmit to the mobile station apparatus first information and second information by a Radio Resource Control (RRC) message to make the mobile station apparatus use a physical random access channel for a radio resource request,
the first information and the second information being information for selecting a cell from among the plurality of cells aggregated and a random access channel, the cell being used for the mobile station apparatus to request an uplink radio resource which is required for the mobile station apparatus to transmit uplink data the first information including a transmission setting of the random access channel on an uplink of the cell, and the random access channel for the radio resource request based on second information not including an uplink control channel resource for the radio resource request.

3. An integrated circuit implemented in a mobile station apparatus which is configured to and/or programmed to use a plurality of cells aggregated to connect to a base station apparatus, the integrated circuit configured to and/or programmed to cause the mobile station apparatus to exert a plurality of functions comprising:

a circuitry configured and/or programmed to determine,
   a cell from among the plurality of cells aggregated,
      the cell determined based on first information which is transmitted from the base station apparatus to the mobile station apparatus by a Radio Resource Control (RRC) message,
      the first information including a transmission setting of a random access channel on an uplink of the cell,
      the cell used to transmit a request an uplink radio resource which is required to transmit uplink data, and
   the random access channel for the radio resource request based on second information not including an uplink control channel resource for the radio resource request,
      the second information being transmitted from the base station apparatus to the mobile station apparatus by the RRC message.

4. An integrated circuit implemented in a base station apparatus which is configured to and/or programmed to use a plurality of cells aggregated to connect to a mobile station apparatus, the integrated circuit configured to and/or programmed to cause the base station apparatus to exert a plurality of functions comprising:

a transmission circuitry configured to and/or programmed transmit, to the mobile station apparatus, first information and second information by a Radio Resource Control (RRC) message to make the mobile station apparatus use a physical random access channel for a radio resource request, the first information and the second information being information for selecting a cell from among the plurality of cells aggregated and a random access channel, the cell being used for the mobile station apparatus to request an uplink radio resource which is required for the mobile station apparatus to transmit uplink data, the first information including a transmission setting of the random access channel on an uplink of the cell, and the random access channel for the radio resource request based on second information not including an uplink control channel resource for the radio resource request.

* * * * *